US010528895B2

(12) United States Patent
Sedlarevic et al.

(10) Patent No.: US 10,528,895 B2
(45) Date of Patent: Jan. 7, 2020

(54) SYSTEM AND METHOD FOR FACILITATING TRAVEL PAYMENTS

(71) Applicant: Troovo Pty Ltd, East Melbourne, VIC (AU)

(72) Inventors: Tarik Sedlarevic, Abbotsford (AU); Kurt Knackstedt, Darlinghurst (AU)

(73) Assignee: Troovo Pty Ltd, East Melbourne (AU)

( * ) Notice: Subject to any disclaimer, the term of this patent is extended or adjusted under 35 U.S.C. 154(b) by 254 days.

(21) Appl. No.: 15/717,283

(22) Filed: Sep. 27, 2017

(65) Prior Publication Data

US 2018/0089598 A1 Mar. 29, 2018

(30) Foreign Application Priority Data

Sep. 27, 2016 (AU) .................................. 2016903907

(51) Int. Cl.
*G06Q 40/00* (2012.01)
*G06Q 10/02* (2012.01)
*G06Q 20/10* (2012.01)
*G06Q 20/34* (2012.01)

(52) U.S. Cl.
CPC .......... *G06Q 10/02* (2013.01); *G06Q 20/102* (2013.01); *G06Q 20/351* (2013.01)

(58) Field of Classification Search
USPC ....................................................... 705/5–6
See application file for complete search history.

(56) References Cited

U.S. PATENT DOCUMENTS

| 8,762,185 | B2 | 6/2014 | Shaw et al. | |
|---|---|---|---|---|
| 9,704,110 | B2 | 7/2017 | Shaw et al. | |
| 2001/0051917 | A1* | 12/2001 | Bissonette | G06Q 20/10 705/39 |
| 2005/0165902 | A1* | 7/2005 | Hellenthal | H04L 29/06 709/217 |
| 2008/0021893 | A1 | 1/2008 | Bakalash et al. | |
| 2008/0228648 | A1* | 9/2008 | Kemper | G06Q 20/04 705/44 |
| 2009/0287600 | A1* | 11/2009 | Amorosa | G06Q 20/10 705/39 |
| 2010/0185505 | A1* | 7/2010 | Sprogoe | G06Q 20/06 705/14.27 |
| 2012/0185378 | A1 | 7/2012 | Liu | |
| 2012/0259667 | A1* | 10/2012 | Pelissier | G06Q 10/02 705/5 |
| 2015/0206251 | A1* | 7/2015 | Yofe | G06Q 40/12 705/30 |

OTHER PUBLICATIONS

International Search Report and Written Opinion from PCT Application No. PCT/AU2017/051056, dated Dec. 22, 2017.

(Continued)

*Primary Examiner* — Tonya Joseph
(74) *Attorney, Agent, or Firm* — Maschoff Brennan

(57) ABSTRACT

Systems and methods described herein provide a travel payment intermediary system configured to analyse travel booking data and identify itinerary item transactions eligible for virtual credit card (VCC) payments. For each of these itinerary item transactions the system and method can automatically trigger generation of an appropriate VCC to affect payment. Embodiments can also update a travel booking with data to associate the generated VCC with the itinerary item for payment.

12 Claims, 12 Drawing Sheets

(56) References Cited

OTHER PUBLICATIONS

Sabre Virtual Payments—Traveler [retrieved from the internet on Dec. 18, 2017]; https://web.archieve.org/web/20160825213658/https://www.sabretravelnetwork.com/home/solutions/products/sabre_virtual_payments_traveler; Published on Aug. 25, 2016 according to the Wayback Machine, see sections "What's in it for you" and "How it works for you".
International Preliminary Report on Patentability from PCT Application No. PCT/AU2017/051056, dated May 2, 2018.
International Search Report from PCT Application No. PCT/AU2017/051056, dated Dec. 22, 2017.
Sabre Virtual Payments—Traveler [retrieved from internet on Dec. 18, 2017] https://web.archive.org/web/20160825213658/https://www.sabretravelnetwork.com/home/solutions/products/sabre_virtual_payments_traveler Published on Aug. 25, 2016 according to the Wayback machine, see sections "What's in it for you" and "How it works for you".

* cited by examiner

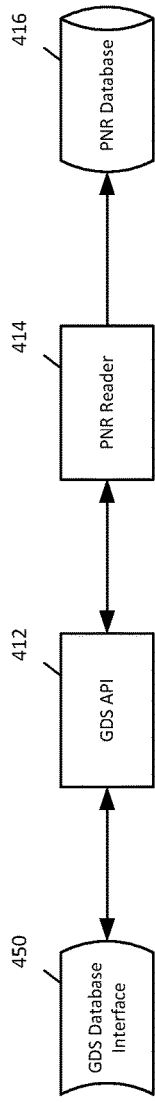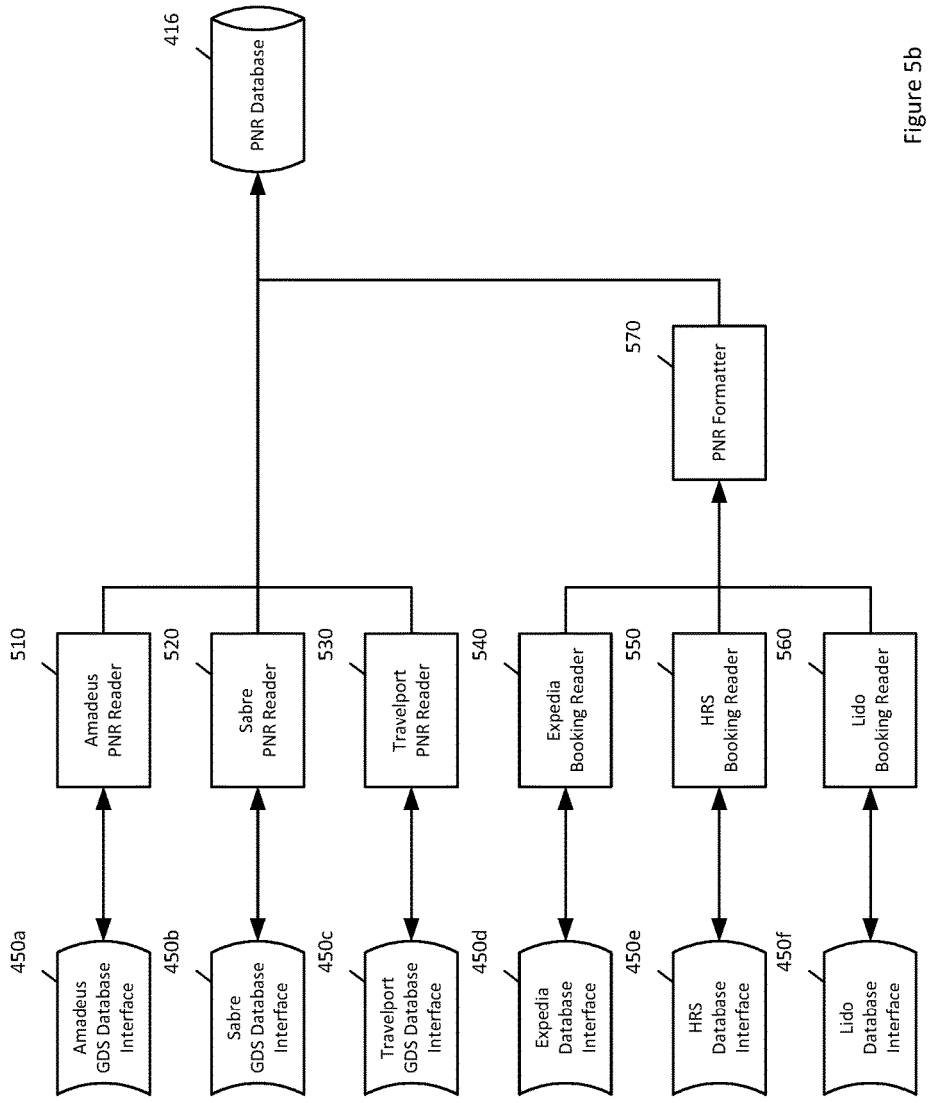

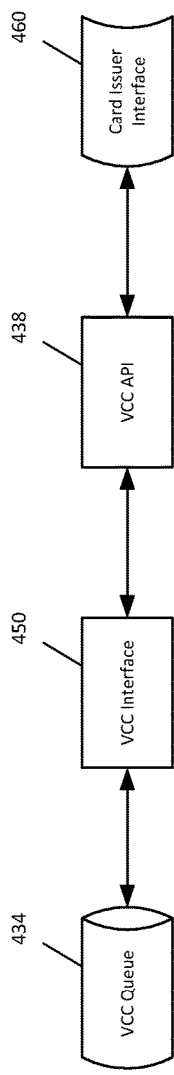
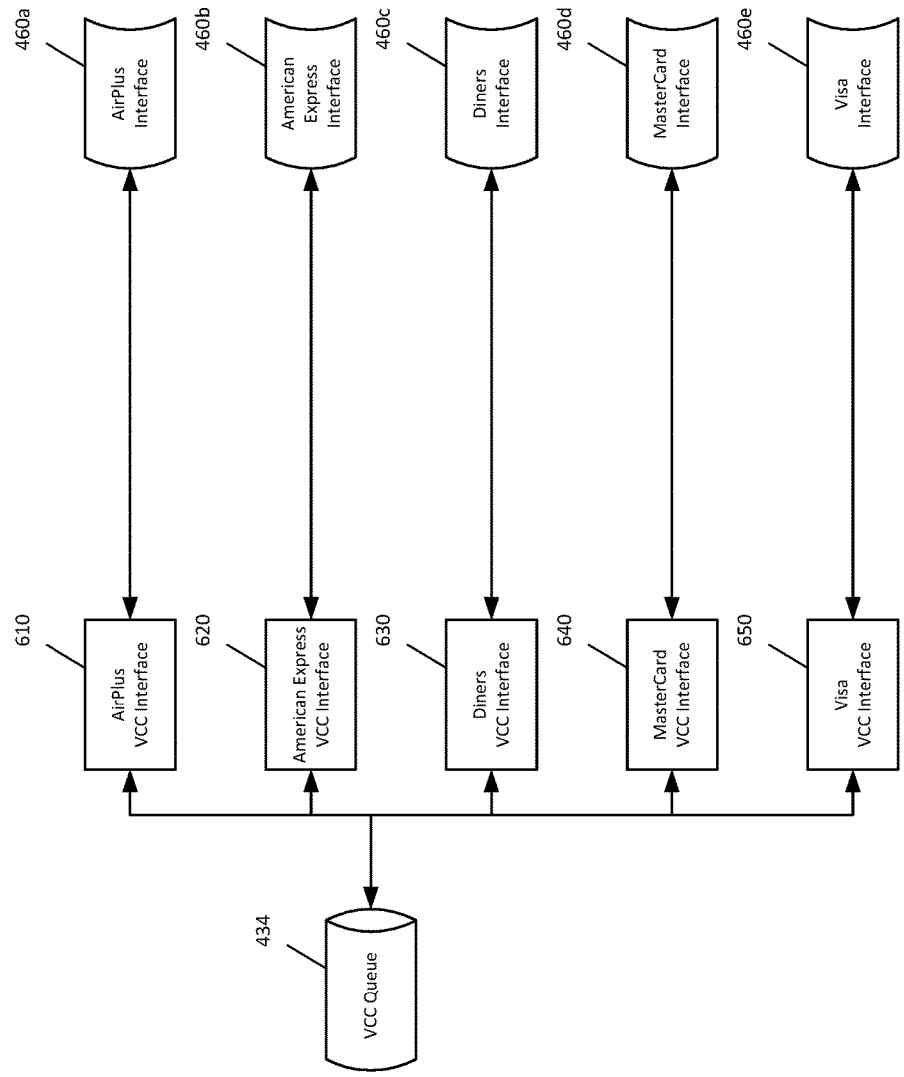
Figure 6a
Figure 6b

SYSTEM AND METHOD FOR FACILITATING TRAVEL PAYMENTS

CROSS-REFERENCE TO RELATED APPLICATIONS

The present invention claims priority to and the benefit of Australian Patent Application Serial No. 2016903907, entitled SYSTEM AND METHOD FOR FACILITATING TRAVEL PAYMENTS, which was filed on Sep. 27, 2016, and is hereby incorporated by reference in its entirety.

TECHNICAL FIELD

The relevant technical field is computer system based travel booking systems, and in particular travel booking systems to interwork with and integrate services of different travel suppliers and services including payment services.

BACKGROUND

The travel industry involves a large number of different suppliers and travel products covering different aspects of a travel itinerary, for example, including flights, transfers, accommodation, hire vehicles, tours, meal vouchers, tickets for attractions etc. and involving a plurality of different booking systems. Travel plans are often facilitated by travel agents who will coordinate travellers' itinerary and bookings, often by manually accessing a variety of different booking systems. The travel agent will typically also facilitate travel payments, for example by receiving pre-payment invoices or quotes from the various suppliers, and billing these to the traveller in a consolidated invoice. Then, once the consolidated invoice is paid, the travel agent distributes appropriate payments to the individual suppliers. This often requires significant manual reconciliation and processing.

Recent developments in internet based travel booking systems have enabled travellers (individuals and corporations) to more easily plan and book their own travel, online. Such travel booking systems typically require payment up front using a credit card. But some aspects of travel costs are typically post-paid, such as payment of hotel accommodation at the conclusion of a stay, meals and incidental costs. A significant part of the cost overheads for corporate travel is associated with reconciliation of travel expenses incurred on a central billing account (whether it's a corporate credit card or other more sophisticated but similar solutions).

There is a need for improvements in systems for facilitating payments for different aspects of travel.

SUMMARY OF THE INVENTION

According to one aspect there is provided a travel payment intermediary system implemented using computer processing and memory resources and configured to integrate with one or more travel booking systems and one or more virtual credit card issuing systems via a communication network, the system comprising:
a travel booking system interface configured to communicate with at least one travel booking system to obtain travel booking data of a travel booking associated with at least one traveller, the booking data including traveller data enabling identification of the at least one traveller, and trip data defining one or more trip components of an itinerary for the at least one traveller;
a booking analyser engine configured to analyse the obtained booking data and determine, for each trip component, cost component data associated with the trip component, the cost component data including virtual credit card payment eligibility for the trip component; and
a virtual credit card (VCC) interface configured to:
generate a VCC request using the cost component data for a trip component where the cost component data indicates eligibility for VCC payment;
forward the VCC request to a VCC issuing system;
monitor for receipt of a VCC generated by the VCC issuing system;
receiving the VCC from the VCC issuing system; and
in response to receiving the VCC, triggering the analyser engine to associate the VCC with the trip component in the cost component data and update the travel booking data in the travel booking system.

In some embodiments the booking analyser engine is configured to apply analysis rules to, for each item of an itinerary:
determine if a cost component is associated with the itinerary item, and where a cost component is associated with the itinerary item:
determine item value data, and cost timing data;
determine, for the cost component, payment types accepted and where the itinerary item cost component is VCC eligible. For example, the booking analyser engine can be configured to apply analysis rules to select a VCC supplier for a VCC eligible cost component.

In some embodiments the travel booking system interface is a machine to machine (M2M) interface configured to retrieve travel data from one or more global distribution systems storing traveller booking data. In an embodiment the travel booking system interface M2M interface provides a standardised interface for communication with each of the one or more GDSs using a generic superset application programming interface (API) for communicating with the one or more global distribution systems.

In some embodiments the travel booking system interface is configured to periodically query each of the one or more travel booking systems to retrieve travel booking data.

In some embodiments the VCC interface is a machine to machine (M2M) interface configured to utilise one or more VCC supplier application programming interfaces (APIs) and manage asynchronous requesting and receiving of VCCs. In some embodiments the VCC interface uses a queuing system for managing asynchronous requesting and receiving of VCCs, the queueing system comprising at least one temporary database configured to store a copy of each transmitted VCC request in a database record, the database record including VCC request data and VCC request status, and wherein the database record is updated with VCC details and the VCC status updated in response to receiving VCC details from a VCC generator.

An embodiment of the system further comprises a communication interface configured to provide generated VCC data to a destination associated with the trip component associated with the VCC. For example, communication interface can be configured to communicate the generated VCC data can be provided via a secure communication interface. In an embodiment the communication interface is configured to automatically transit the VCC data to a destination.

The communication interface can be configured to provide controlled access to the VCC data. The communication interface can be configured to provide access to the VCC data for a limited period of time, the limited period of time being temporally associated with the trip component for which the VCC was generated.

According to another aspect there is provided a method of facilitating a travel payment executed by a travel payment intermediary system implemented using computer processing and memory resources and configured to integrate with one or more travel booking systems and one or more virtual credit card issuing systems via a communication network, the method comprising the steps of:

obtaining travel booking data, by a travel booking system interface configured to communicate with at least one travel booking system, a travel booking associated with at least one traveller, the booking data including traveller data enabling identification of the at least one traveller, and trip data defining one or more trip components of an itinerary for the at least one traveller;

analysing, by a booking analyser engine, the obtained booking data to determine, for each trip component, cost component data associated with the trip component, the cost component data including virtual credit card payment eligibility for the trip component; and for each trip component where the cost component data indicates eligibility for VCC payment, causing a virtual credit card (VCC) interface to perform the steps of:

generating a VCC request using the cost component data for a trip component;

forwarding the VCC request to a VCC issuing system;

monitoring for receipt of a VCC generated by the VCC issuing system;

receiving the VCC from the VCC issuing system; and in response to receiving the VCC, triggering the analyser engine to associate the VCC with the trip component in the cost component data and update the travel booking data in the travel booking system.

BRIEF DESCRIPTION OF THE DRAWINGS

FIG. 5a is a block diagram of a travel booking interface in accordance with an embodiment of the travel payment intermediary system;

FIG. 5b is a block diagram of an example of an alternative architecture for a travel booking interface;

FIG. 6a is a block diagram of a Virtual Credit Card manager interface in accordance with an embodiment of the travel payment intermediary system;

FIG. 6b is a block diagram of an example of an alternative architecture for a virtual credit card interface;

DETAILED DESCRIPTION

Systems and methods described herein provide a travel payment intermediary system configured to analyse travel booking data and identify itinerary item transactions eligible for virtual credit card (VCC) payments, and for each of these itinerary item transaction trigger generation of an appropriate VCC to affect payment.

Virtual Credit Cards (VCC) enable creating a 1:1 match between the payment and the trip (or a component of the trip—e.g. a hotel stay). However, current processes for the use of the VCCs for travel bookings requires that a Travel Agent manually creates a VCC and assigns it to the booking (PNR—Passenger Name Record) or that the Online Booking Tool (OBT) used by the Traveller supports the creation of VCCs. The former adds extra complexity and unreliability to the process, defeating the underlying purpose of the VCCs. The latter requires third-party travel software tools to support individual banks' APIs and this is not available for the majority of the OBTs currently used in the market.

The travel payment intermediary systems and methods disclosed herein advantageously automate the creation of the VCCs after the booking has been created by the Travel Agent or by the Traveller directly.

Figure 1:
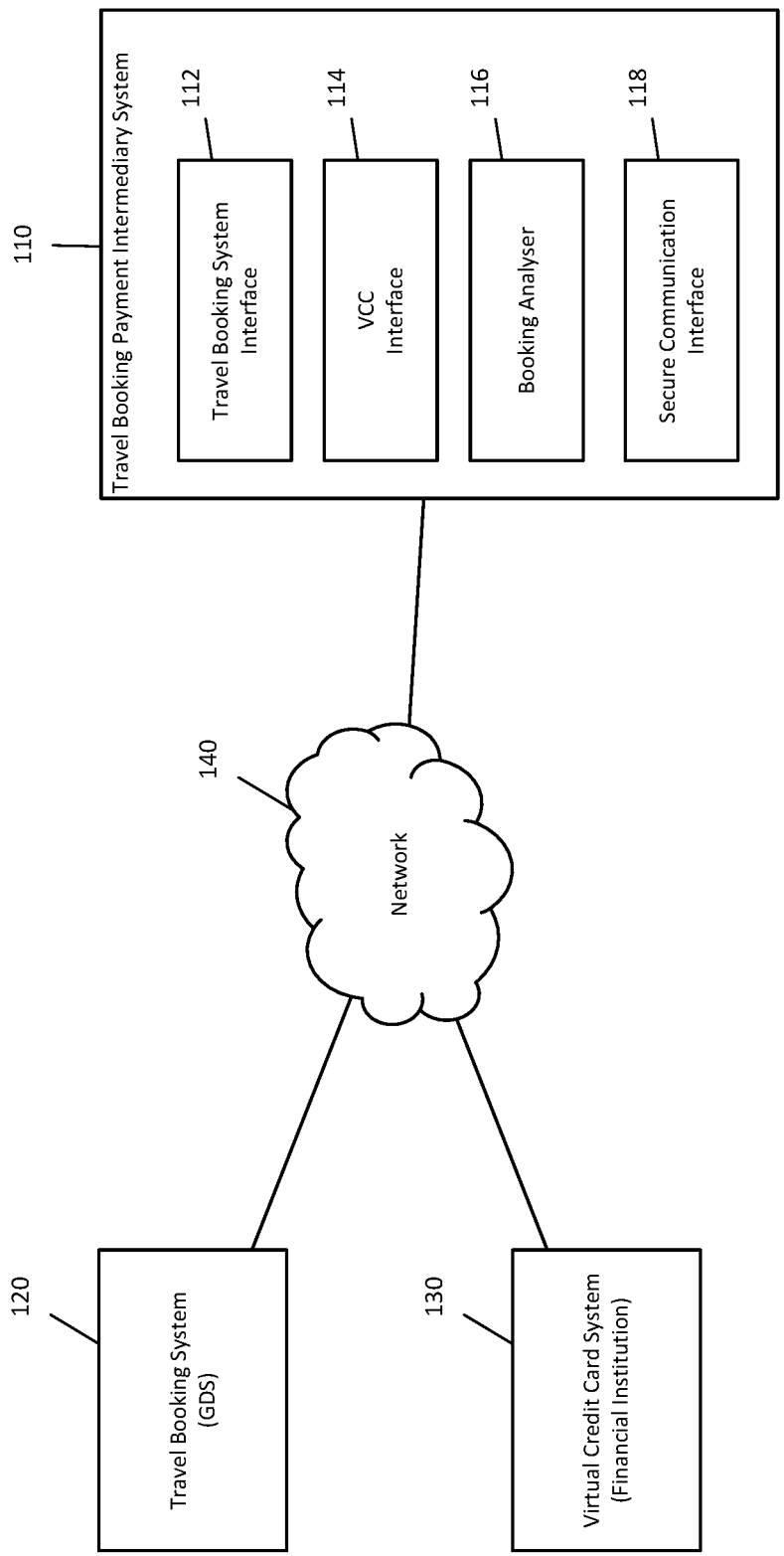
FIG. 1 is a high level block diagram illustrating the operational context of embodiments of the travel payment intermediary system.

With reference to FIG. 1 an embodiment of the present invention provides a travel booking payment intermediary system 110 implemented using computer processing and memory resources and configured to integrate with one or more travel booking systems 120 and one or more virtual credit card issuing systems 130 via a communication network 140. The system comprises a travel booking system interface 112, a booking analyser 116 and a virtual credit card (VCC) interface 114.

The travel booking system interface 110 is configured to communicate with at least one travel booking system 120 used for a travel booking associated with at least one traveller, and obtain travel booking data for the at least one traveller. The booking data includes traveller data enabling identification of the at least one traveller and trip data defining one or more trip components of an itinerary for the at least one traveller. The booking analyser engine 116 is configured to analyse the obtained itinerary data and determine, for each trip component, cost component data associated with the trip component. The cost component data for a trip component includes virtual credit card payment eligibility for the trip component.

The virtual credit card (VCC) interface 114 is configured to generate a VCC request using the cost component data for a trip component where the cost component data indicates eligibility for VCC payment. The VCC engine forwards the VCC request to a VCC issuing system, and monitors for receipt of a VCC generated by the VCC issuing system. The VCC is received by the VCC interface and in response the analyser engine is caused to associate the VCC with the trip component in the cost component data.

A key advantage of this approach is that the process of analysing bookings and generation of VCCs for eligible trip components is fully automated. Further the booking analysis and VCC generation can be configured to work agnostically of the Travel Agent's system or their Online Booking Tool system. The system and method can be rules-based to enable consistent operation, while also allowing straight forward adjustment or customisation based on updating rules.

The system can be implemented using computer processing and memory resources in the form of one or more network connected servers and databases, these hardware resources executing software programmed to implement the functions as described above. Alternatively the computer processing and memory resources may be network accessible distributed "cloud based" resources, executing software to implement the system functionality as described above. Some embodiments may utilise a combination of dedicated hardware and shared resources. A variety of different system architectures are contemplated within the scope of the present invention.

The travel booking system interface 112 is configured for compatibility with at least one global distribution system (GDS) 120 used for travel bookings. A GDS 120 comprises an interface for searching, reserving and purchasing products (e.g. flights, hotels, cars, etc.) and database for storing travel reservation and booking data. The system may be configured for compatibility with a plurality of GDSs utilised by many different travel management companies and via online booking tools. Such systems are known in the travel industry so the end to end operation or configuration of such systems will not be discussed in detail.

For the sake of context of the present invention, a brief description of a travel booking process will be described with reference to FIG. 2. A traveller 210 can make enquiries and travel bookings via a Travel Management Company (TMC) 215 also commonly referred to as a Travel Agency, typically either by phone or face to face. The TCM agent will typically discuss the traveller's plans and lookup booking options via an agent interface to the GDS to query the GDS 230 for information such as availability. For example, the agent interface may be a software application operating on a computer system, such as an agent's desktop or tablet 215, having a data network connection to enable data communication with the GDS 230 via a communication network. In some instances the travel agent system may be a portal directly to the GDS without requiring an intermediary system or communication network.

The Travel Agent receives a request to make a booking for a Traveller. The Agent makes a booking for the flights, hotels and/or cars at the appropriate destinations, using the Traveller Profile stored in their booking systems. The source of the booking may be Global Distribution Systems (GDS—e.g. Amadeus, Sabre, Travelport etc.) or it may be performed through a supplier's system (e.g. airline's proprietary booking system, Expedia for hotel content etc.).

Alternatively the user 210 may access an online booking tool 220. Online booking tools are typically operate as an intermediary to one or more GDS systems, and provide software tools to allow users to browse different travel products and facilitate making reservations in the GDS. Most online booking tools aim to provide software services traditionally provided by human travel agents and allow travellers to manage their own bookings.

Via either an online interface 220 or an agent computer system 215 traveller data and booking information is entered into the GDS 230 and stored in a Passenger Name Record (PNR). Key data entered into the GDS 230 is traveller data and trip data. The Traveller Information is considered Personally Identifiable Information as it contains direct personal details of a traveller for each booking. This information can include data such as full name, contact details and identification document details (for example, passport, social security number, driver's licence etc.). The traveller data is created and stored in the GDS as part of the travel booking (PNR). The Trip Information contains the travel details of the bookings. This information on its own does not contain Personally Identifiable Information. The trip data is created and stored in the GDS as part of the travel booking (PNR).

The GDS can also store form of payment information, which can include credit card data. In the current manual workflow used in the travel industry, during the booking process, the Agent makes a decision which Form(s) of Payment to use for which parts of the transaction (e.g. American Express Business Travel Account for flights, corporate credit card for hotels, Traveller's credit card for cars, Invoice for fees etc.). In this traditional processing, for Virtual Credit Card (VCC) payment, the card issuer's VCC API must be integrated into the offline booking tool used by the Travel Agent (typically provided by the GDS they use).

In contrast, using the described travel payment intermediary system, during the booking process, the Agent is not required to decide or take any action in regard to which Form(s) of Payment are to be used, or to determine if different types of Form of Payments can be used for different parts of the transaction. In embodiments of the described system the determination of Form of Payment for each part of a transaction can be performed by the PNR Analyser 260 based on the Corporate Policy 265. An advantage of this is reduction of the work and capability required of the Agent (whether human or electronic i.e. an online booking tool). Further, the Agent need not communicate with a financial institution for requesting VCC. In the case of a human Agent there is no need to manually request a VCC. In the case of an Agent system tool (such as a proprietary/private online booking tool or offline booking tool used by human travel agents) there is no need to integrate with financial institutions for VCC generation. For example, for Virtual Credit Card (VCC) payment, the card issuer's VCC API 275 is not required to be integrated into the offline booking tool 215 used by the Travel Agent—in embodiments of the system this can be provided by the VCC Interface 270 after the booking is made. This has an advantage of significantly reducing the integration requirements for the Agent system (i.e. offline booking system) as functionality for both analysing the booking a data to determine Form of Payment for each component of the booking and generation of any VCC is handled via the travel payment intermediary system.

In another example the Traveller makes a booking directly for flights, hotels and/or cars through an Online Booking Tool (OBT). The source of the bookings may be GDS or third-party systems. In the current workflow used in the travel industry, during the booking process, the Traveller, depending on their corporate travel policy, may make a decision which Form(s) of Payment to use for which parts of the transaction. For VCC payment, the card issuer's API must be integrated into the OBT.

In contrast, using the described travel payment intermediary system, during the booking process, the Traveller 210 is not required to make a decision regarding which Form(s) of Payment to use for which parts of the transaction—this is decided by the PNR Analyser 260 based on the Corporate Policy 265. Further, for Virtual Credit Card (VCC) payment, the card issuer's VCC API 275 (for each card issuer to interwork with) is not required to be integrated into the OBT 220 used by the Traveller—this is provided by the VCC Interface 270 after the booking is made. As the booking analysis for Form of Payment and generation of VCCs is implemented in the travel payment intermediary system, this functionality need not be implemented nor maintained in the OBT 220.

It is an advantage or embodiments of the present system that the process for generating VCCs is automated. Form of payment data can be generated automatically by the system and added into the PNR stored in the GDS.

Figure 2:
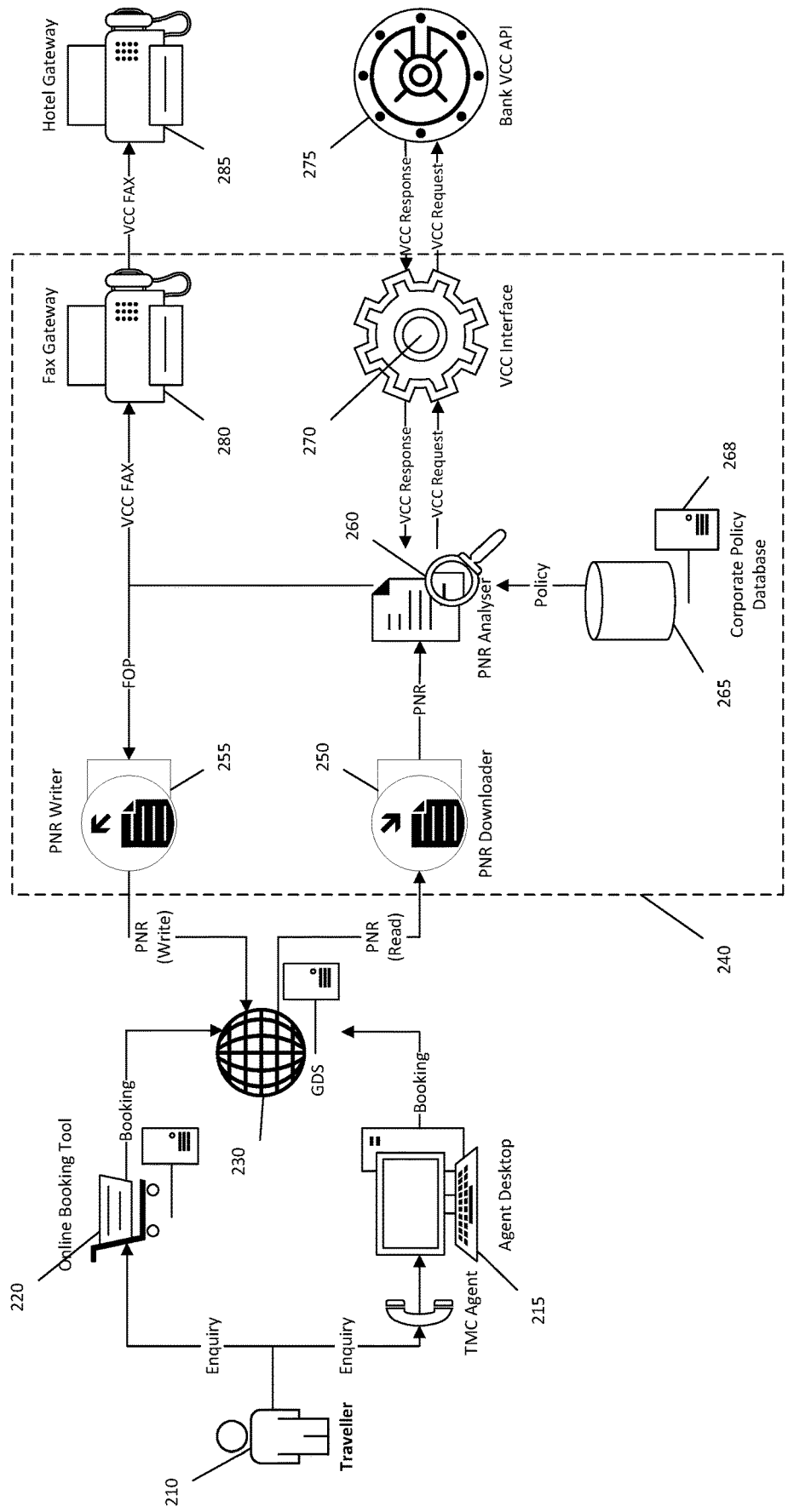
FIG. 2 illustrates an example of the system.
Figure 3:
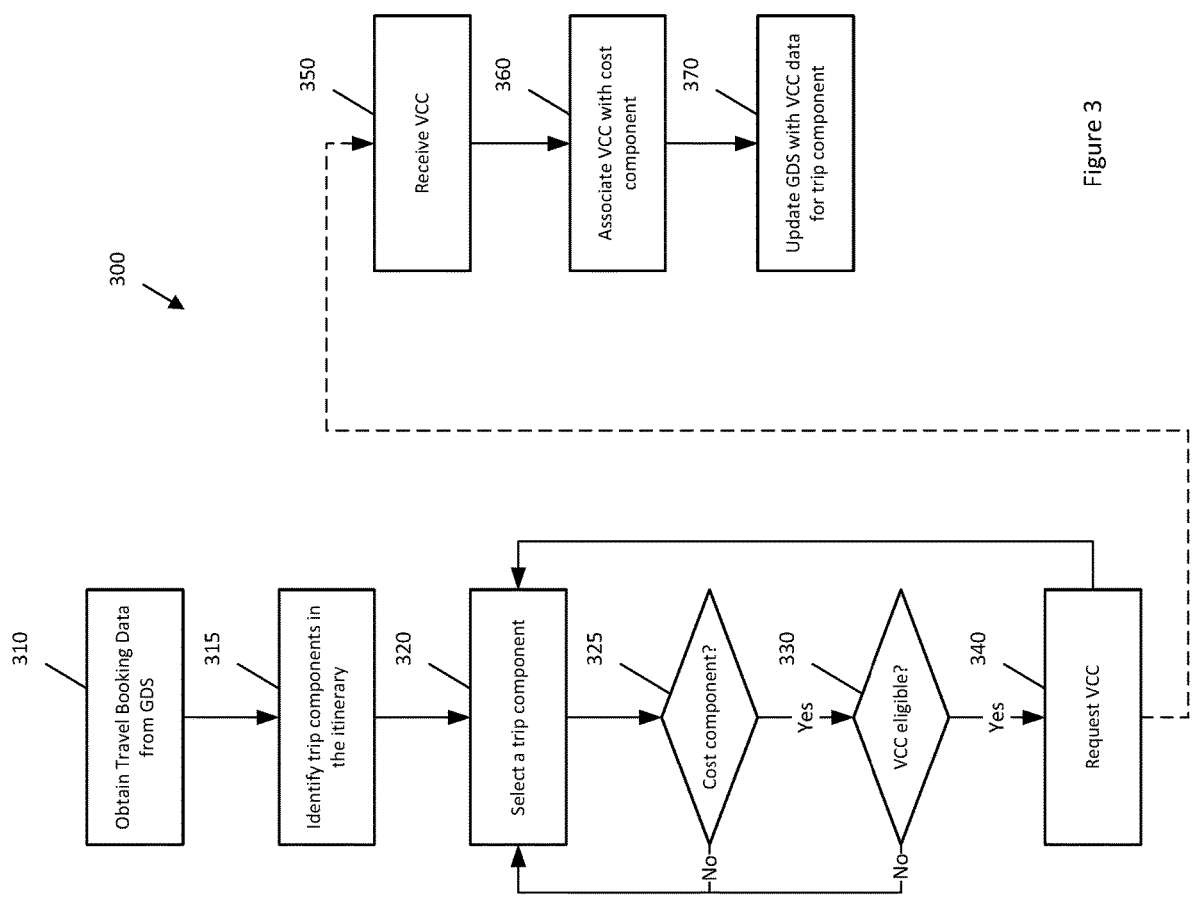
FIG. 3 is a high level flow chart illustrating a system process for analysis of a travel booking and generating virtual credit cards.

An example of an embodiment of the travel booking system interface 240 is illustrated in FIG. 2. The system 240 operates as an intermediary between the GDS 230 and financial institution system 275 to automate requesting and subsequent handing of VCCs for travel bookings. In the embodiment illustrated in FIG. 2, the interface to the GDS is provided by the PNR Reader 250 and PNR Writer 255. A high level example of the function of the system is also illustrated by the flowchart of FIG. 3, which shows the main steps 300 for automated generation of VCCs based on travel booking data from the GDS.

The PNR Reader 250 is configured to read data from the PNR, for example, downloading a booking (made by an Agent or a Traveller) from the GDS 310. The system includes a PNR analyser 260 configured to analyse downloaded PNR booking data to determine if any one or more travel components have associated costs components. The PNR analyser in this embodiment is an analysis engine that applies analysis and policy rules 268 stored in memory 265 to first analyse retrieved booking data to identify individual trip components 315, and then for each trip component 320 determine if there is an associated cost component 325 and whether the cost component is eligible for VCC payment 330.

In an embodiment if the analysis determines any cost components are suitable for application of Virtual credit cards, then the system can trigger generation of a VCC. The system can be configured to automatically trigger generation of VCCs for eligible trip components, in accordance with client preferences as configured in corporate policy rules. The corporate policy may specify which trip components can be paid using VCCs. Optionally a travel agent may also be allowed to override the form of payment in some embodiments.

The VCC interface 270 generates the VCC through integration with financial institution systems 275. For example, the VCC interface prepares and forwards a VCC request 340 to the financial institution system 275 via a secure machine to machine interface. The VCC interface subsequently receives the generated VCC 350 back from the financial institution system. Once the generated VCC is received this VCC number can be associated with the cost component 360 in the PNR database. The booking stored on the GDS can be updated 370 with the Form of Payment (FOP) details by the PNR Writer 255. The form of payment data is generated by the system and added to the booking information. This information can be used for downstream payment processing (e.g. for air tickets) and/or sent to a third-party to charge against a later date (e.g. for a hotel stay). The system can also be configured to directly notify the merchant (e.g. a hotel) of the VCC number that the booking should be charged to, for example via a secure communication interface or point to point communication such as communication to a hotel fax 285.

Figure 4:
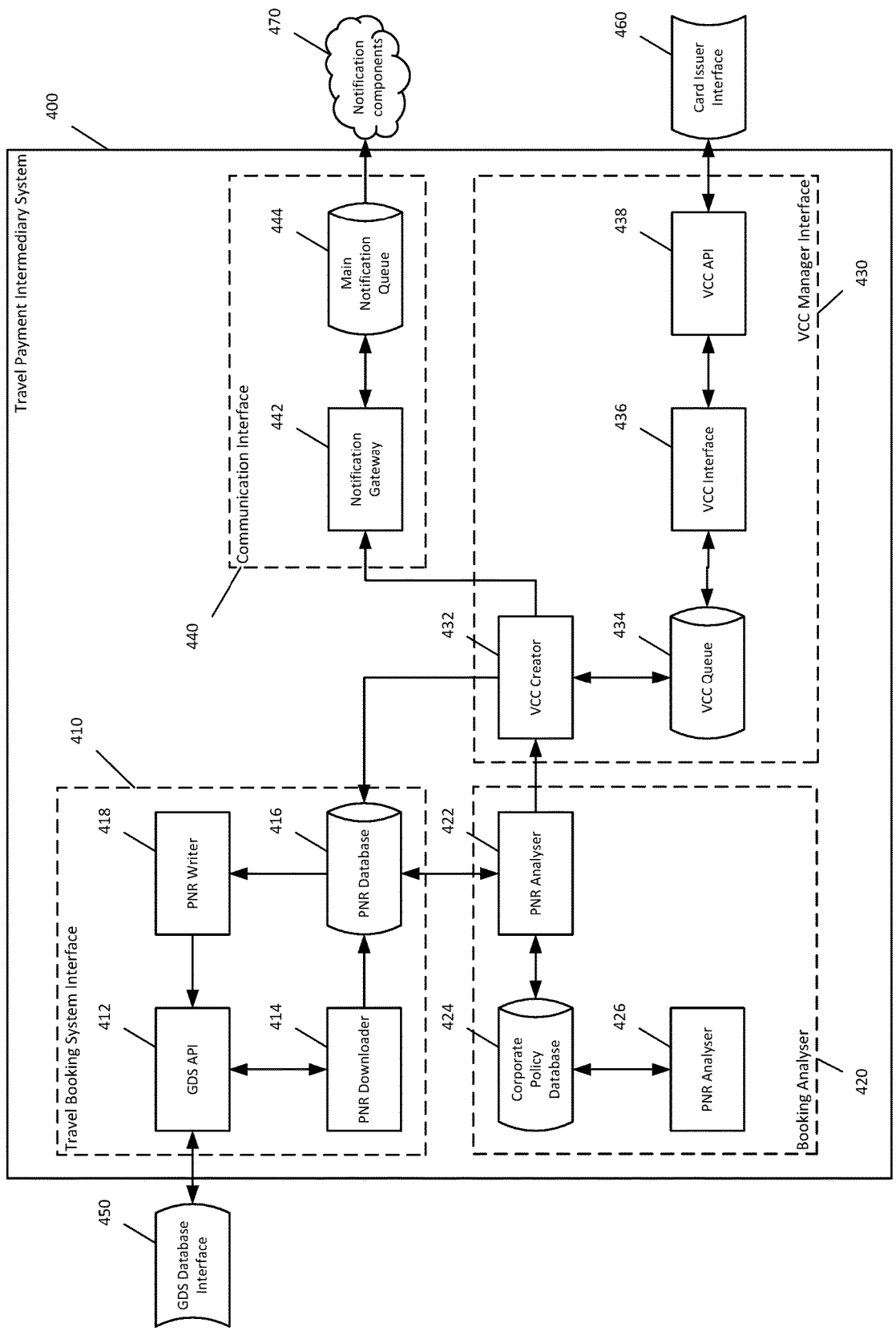
FIG. 4 is a more detailed block diagram of an embodiment of the system.

The system architecture and operation will now be discussed in further detail with reference to FIG. 4. FIG. 4 illustrates an embodiment of a travel payment intermediary system 400, showing an example of system architecture for implementing the travel booking interface 410, booking analyser 420, VCC manager interface 430 and optionally a communication interface 440. The embodiments discussed herein provide more detail regarding a practical implementation of the system.

In this embodiment the travel booking interface 410 comprises a GDS application programming interface (GDS API) 412, PNR Reader 414, PNR Database 416 and PNR Writer 418. As discussed above, the Traveller data is created and stored in the GDS as part of the travel booking (PNR—Passenger Name Record). Offline and Online bookings (PNR—Passenger Name Record) are stored in the GDS used by the Travel Management Company (TMC). With reference to FIG. 4, both the PNR Reader 414 and PNR Writer 418 are configured for machine to machine communication with the GDS database interface 450 via the GDS API 412.

The PNR Reader 414 is configured to retrieve booking data for these bookings from the GDS and store them in the PNR Database 416 for analysis. The PNR Reader 414 can be configured to generate periodic or triggered booking data retrieval requests. The PNR Reader can also be triggered by the GDS.

The PNR Writer 418 is configured to update data in the PNR stored in the GDS via the GDS database interface 450.

The GDS 230 includes a GDS database interface 450 to enable interaction with the GDS and reading and writing of information to the GDS database. For example, each GDS database interface 450 can provide an API (application processing interface) used to retrieve and update bookings stored in the GDS 230.

In current commercial travel systems each different GDS 230 has its own specific and proprietary API. This creates a compatibility problem where there is a need to interact with more than one type of GDS system, for example, requiring support for each of the proprietary APIs.

In embodiments of the present travel booking payment intermediary system this problem is addressed by providing an intermediary system GDS API 412. The intermediary system GDS API 412 is a generic superset API component that provides a standardised interface for communicating with the different GDSs via each GDS database interface 450.

Each GDS provides a machine to machine interface for exchanging data. The differences between these interfaces are significant in relation to connectivity, authentication, data structures and methods to read and write data, and these interfaces frequently change (e.g. to cater for a new type of travel product). Without the intermediary system GDS API 412, these differences would need to be coded into each component (PNR Reader and PNR Writer) separately and maintained on ongoing basis. The intermediary system GDS API 412 abstracts all of the differences and provides efficiency in changes and expansions to support additional GDSs only having to be maintained in one component: GDS API 412.

Figure 5C:
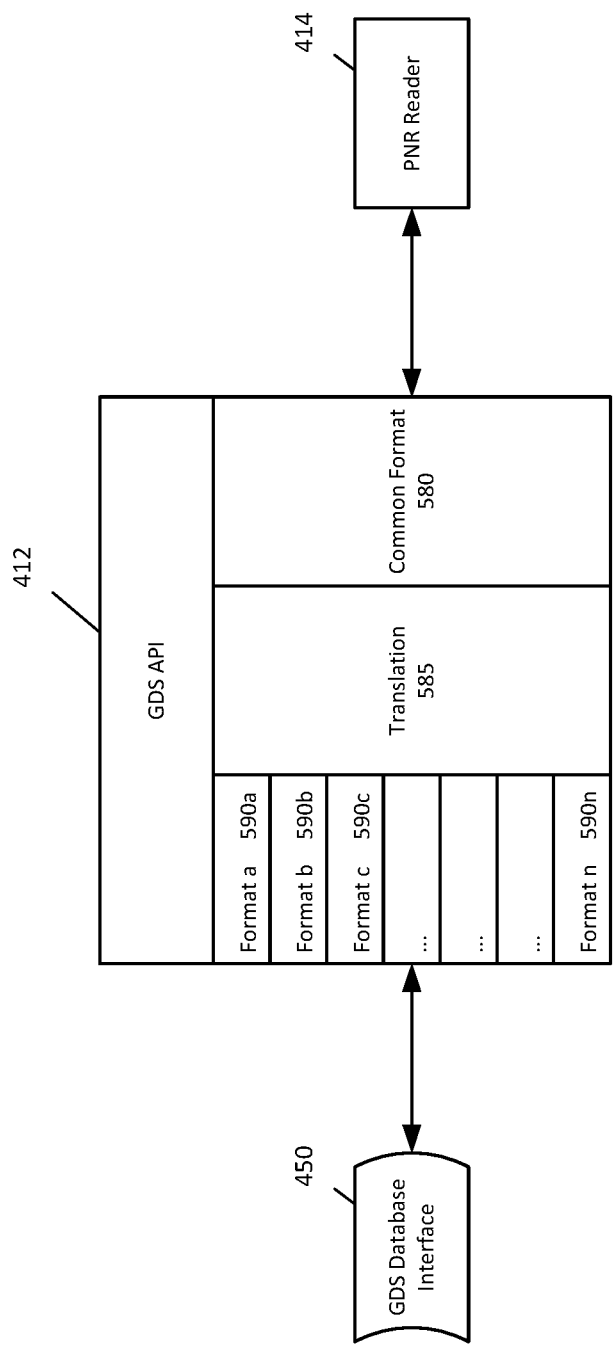
FIG. 5c conceptually illustrates the GDS API functionality for an embodiment of the travel payment intermediary system.

FIG. 5a illustrates the architecture of the present intermediary system, comprising the GDS Interface 450 (for any one or more different types of GDS 450a-f), GDS API 412, PNR Reader 414 and PNR Database 416. FIG. 5b illustrates an example of an alternative architecture that is required without the GDS API 412, where a separate PNR Reader or Booking Reader component 510, 520, 530, 540, 550, 560 would need to be created and maintained for each GDS 450a-f (e.g. Amadeus 540a, Sabre 540b, Travelport 540c etc.) or pseudo-GDS (e.g. Expedia 450d, HRS 450e, Lido 450f etc.) that would need to write to the PNR Database 416. In addition, a PNR Formatter 570 would need to be created that would take bookings from pseudo-GDS 540d-f databases and format them consistently to how a GDS system typically structures trip data. In contrast, in the present system (as illustrated in FIG. 5a) the GDS API 412 is configured to interface to any GDS interface 450a-f, GDS or pseudo GDS to provide a generic (or GDS agnostic) interface for the PNR Reader 414 and PNR Writer 416.

The GDS API 412 is implemented using a protocol or architecture providing standard operations (such as READ and EDIT) from the PNR Reader and PNR Writer perspective, and the GDS API operates to translate the standard operations into a message format appropriate for each GDS. The GDS API functionality is conceptually illustrated in FIG. 5c. The PNR Reader 414 and PNR Writer 418 use a common message format that is GDS agnostic to request standard GDS operations (i.e. READ and EDIT) via the GDS API. A translation function 585 in the GDS API 412 translates the request into a message format 590a-n appropriate for the destination GDS. Similarly return messages in GDS specific format 590a-n are translated 585 into the common format messages 580 for the PNR Reader and PNR Writer. For example, to obtain PNR record data the PNR Reader inputs to the GDS API provider data (i.e. a URL for a travel agent GDS), the GDS API 412 uses this provider data to format and direct a message to the appropriate GDS interface. The message is parsed by the GDS interface and triggers the GDS interface internal operations to return representations of the data in the GDS database. The returned message is received by the GDS API and the data extracted from the message by the translation function 585 and returned to the PNR Reader by the GDS API in the common format 580. The translation function 585 is configured for each standard operation request to use data from a common format request to populate a template request in a GDS specific format for forwarding to the GDS database interface. Return data from the GDS is received in the GDS specific format similarly used to populate a common format template message for forwarding to the PNR Reader or PNR Writer. Thus, from the PNR Reader and PRN Writer perspective a common GDS API is used for differently configured GDS or pseudo-GDS systems. In the embodiment illustrated request control is abstracted from the step of sending the request, so this processing is common for all GDSs and handled in the common format 580 between the GDS API and PNR Reader and PNR Writer. Thus only handling message send/receive by the GDS API is required to be GDS specific. This has an advantage in that from a system perspective requests are handled in a GDS agnostic manner. To facilitate addition of a new GDS the only modification required is to the GDS API to add an appropriate signal format.

In an embodiment, the GDS API 412 can be implemented as a REST (representational state transfer) API with JSON (JavaScript Object Notation) data objects and OAuth 2.0 authentication.

The following functions can be provided through the GDS API 412:

| Function | Description | Input | Output |
| --- | --- | --- | --- |
| Get-PNR | Get details of existing PNR Used by PNR Reader | Provider | PNR ID Traveller(s) Details Trip(s) Details Form(s) of Payment Details |
| Edit-PNR | Edit details of existing PNR Used by PNR Writer | PNR ID Provider Form of Payment | None |

The PNR Reader component 414 is configured to retrieve bookings form the GDS and store these in the PNR Database 416. Storing a copy of the booking data in a local database, separate from the GDS database, for analysis has an advantage of reducing the number of queries to the GDS and risk to data integrity of the GDS.

The PNR Reader component 412 is configured to automatically connect to the GDSs via the GDS API and respective GDS database interfaces 450 to retrieve bookings. This automatic connection can be periodic with the frequency and interval configurable in the system. In some embodiments the booking retrieval frequency may be configurable for each different GDS. For example, for one GDS the system the PNR Reader may be configured to perform batch retrieval and processing of booking data, say once or twice per day, for another GDS the system the PNR Reader may be configured to retrieve and process booking data every 30 minutes, for another GDS the download frequency may be every minute. Alternatively the booking retrieval may be triggered by the GDS is some embodiments. A manually triggered booking retrieval can also be provided in some embodiments—for example to enable a travel agent to trigger the system to retrieve booking data, and generate VCCs, rather than waiting on periodic or batch processing. For example, a GDS may be configured to push PNR data to the PNR Reader 414 via the GDS interface and GDS API 412. Alternatively, the GDS may be configured to transmit a trigger to the PNR via the GDS API to cause the PNR Reader to retrieve PNR data using a process as described above.

In an embodiment of the system of FIG. 4, the PNR Reader component 412 connects to GDSs 450 at frequent regular intervals using the credentials configured for each TMC and retrieves any bookings (PNRs) from configured bookings queues. The PNRs that are downloaded are then stored in the PNR Database component 416.

The PNR Database component 416 stores the PNR(s) it receives from the PNR Reader component 414 and makes them available to the PNR Analyser component 422.

The PNR Database can consist of the following information:

| Field | Description | Example |
| --- | --- | --- |
| GDS ID | Unique identifier in the GDS (PNR) for the booking | Numeric or Alphanumeric value |
| Booking Data | Traveller(s) and Trip (flights, hotels, cars) information for the booking | XML formatted data (array of values: Traveller(s), Trip(s), FOP(s)) |
| Status | Status code for this PNR | Numeric value (0: not processed, 1: queued, 2: delivered, 4: failed, 5: requested) |

In preferred embodiments of the system the Booking Data in the PNR Database 416 is stored encrypted, as it contains unmasked/readable credit card data. The data is encrypted using symmetric key encryption, with the key stored in a key vault (e.g. Azure Key Vault), against the particular GDS ID.

The PNR Database 416 itself can be further encrypted on the file level (e.g. TDE—Transparent Database Encryption for Microsoft SQL). This can provide additional data security.

The Booking Analyser 420 comprises a PNR Analyser 422, in the embodiment of FIG. 4 the PNR analyser is implemented as a processing engine configured to apply rules defined in the rules database 424. The PNR Analyser 422 processes the PNR and checks it against the corporate rules in the Corporate Policy Database 424.

An advantage of a processing engine and rules based implementation is that the fundamental processing functionality can be programmed into the analysis engine and situational operation readily varied using rules. This enables tailoring of analysis rules to change system operation in accordance with policy or practice changes, and jurisdictional variations. For example, rules can be utilised to define criteria for identification of different types of travel products, if a new type of travel product is made available (for example, a new type of transport or accommodation offering) then new rules defining recognition criteria and VCC eligibility can be introduced into the system entered into the system as new rules or rule modifications. The Policy Manager component 426 provides an interface to enable viewing and editing of policies and rules stored in the Corporate Policy Database 424.

The Corporate Policy Database component 424 stores the Corporate Policy data configured for each client of each TMC, if applicable. The corporate policy data for each client defines the set (or sets) of rules to be applied to analyse travel bookings for that client. It should be appreciated that this also allows client specific updates to their sets of rules.

The corporate policy will include at least two types of rules. Rules of the first type are directed to analysis of the PNR record data to identifying data in the PNR record required for generating the VCCs and to determine eligibility (i.e. true or false) of the whole booking and/or individual travel components to be processed for VCCs. Rules of the second type are directed to generation of new PNR record data, in particular for analysing the extracted and classified PNR records data to control parameters for generation of form of payment data to add to the PNR data, including generation of VCCs.

The Corporate Policy Database 424 consists of the following information:

| Field | Description | Example |
|---|---|---|
| Agency ID | Unique identifier for the Travel Management Company (TMC), including the branch of the TMC | Numeric or Alphanumeric array of values |
| Client ID | Unique identifier for the client of the TMC, including the branch of the client | Numeric or Alphanumeric array of values |
| Corporate Policy | Sequence of rules for determining if booking data requires a VCC | XML formatted data |

The Corporate Policy in the Corporate Policy Database can be stored encrypted, as it may contain unmasked/readable credit card data for Form of Payment matching. The data is encrypted using symmetric key encryption, with the key stored in a key vault (e.g. Azure Key Vault), against the particular Client ID.

The Corporate Policy Database itself can be further encrypted on the file level (e.g. TDE—Transparent Database Encryption for Microsoft SQL).

The PNR Analyser component can be configured to check the PNR Database at frequent regular intervals for PNRs that have not been processed. Alternatively the PNR analyser 422 may be triggered in response to new PNR data being entered into the database by the PNR Reader 414.

The PNR Analyser 442 processes each PNR to extract relevant data. In an example, the PNR Analyser 442 processes each PNR to extract the following information:

Corporate Data
Traveller(s) Data
Trip(s) Data (Flight(s), Hotel(s), Car(s))
Form(s) of Payment Data The PNR Analyser checks the Corporate Data information in the PNR and retrieves the relevant Corporate Policy from the Corporate Policy Database component. If the PNR Analyser does not match the Corporate Data (i.e. the corporate does not have a configured Corporate Policy), it then updates the Status in the PNR Database to Queued (for processing by the PNR Writer).

The PNR Analyser 422 uses the rules in the Corporate Policy 424 to try to match it against the Traveller(s) and Trip(s) Data in the PNR, to extract and classify the PNR data. The rules may include:

Traveller Name (e.g. matching against a specific name)
Traveller Job Title (e.g. matching against a specific title or title containing a specific word like "Manager")
Traveller Job Status (e.g. matching against a status like "Contractor" or "Guest")
Traveller VIP Status (e.g. matching if a traveller is marked as "VIP")
Traveller Cost Centre (e.g. matching against a particular cost centre code or part of code)
Traveller Project Code (e.g. matching against a particular project code or part of code)
Traveller Location (e.g. matching against office location)
Traveller Quantity (e.g. number of travellers on the trip)
Airline Name (e.g. matching against a specific airline)
Airline Fare Class (e.g. matching against a specific fare type like "J/Business Class")
Airline Fare Value (e.g. matching value of the fares against a range)
Airline Flight Locations (e.g. matching locations of inbound or outbound flights, including domestic, regional or international travel)
Hotel Name (e.g. matching against a specific name or name containing a specific word like "Hilton")
Hotel Location (e.g. matching against a specific city or a country)
Hotel Value (e.g. matching value of the hotel stay against a range)
Car Rental Name (e.g. matching against a specific name or name containing a specific word like "Hertz")
Car Rental Location (e.g. matching against a specific city or a country)
Car Rental Class (e.g. matching against a specific class type like "Compact")
Car Rental Value (e.g. matching value of the car rental against a range)
Form of Payment (e.g. if FOP is blank or matching against a specific FOP like corporate credit card number pattern)
Trip Duration (e.g. matching duration of trip against a range)
Trip Date (e.g. matching against a difference between "today" and the date when the trip will occur)

It should be appreciated that this list is not exhaustive and any combination of rules may be defined and will vary between embodiments.

Rules in the corporate policy are also defined for the PNR Analyser to assess eligibility for VCCs, generate FOP data and control generating VCCs.

The rules in the Corporate Policy may be combined with the standard Boolean operators (AND, NOT, OR), comparison operators (=, <>, >, >=, <, <=) and string matching symbols may be used (e.g. "*"). The rules in the Corporate Policy are evaluated in the order they are written in.

For example, for Corporate Policy for a corporate traveller, where the Corporation is a customer of the travel agency, rules can include:

Use Corporate VCC for flight segment if
   Traveller Job Status is "Contractor" AND
   Airline Flight Location is "Domestic"
Use Corporate VCC for car segment if
   Traveller VIP Status is "No" AND
   Car Rental Name is "*Hertz*"
Use Corporate VCC for all trip segments if
   (Traveller Project Code is "6-2*" AND
   Traveller VIP Status is NOT "No") OR
   (Traveller Quantity>2 AND
   Trip Duration>=3)
Use TMC VCC for hotel segment if
   Hotel Value>=200

For example, for Corporate Policy for a leisure traveller, where the Traveller is a customer of the travel agency, rules can include:

Use TMC VCC for all trip segments if
   (Form of Payment is NULL OR
   Trip Date>100) OR
   (Airline Flight Location is "International" AND
   Airline Name is "Qantas" AND
   Airline Fare Value<2000)

If the PNR Analyser 422 matches the data in the PNR to the rules in the Corporate Policy, it then sends a VCC Request to the VCC Creator 432 and updates the Status in the PNR Database 416 to Requested. It should be appreciated that analysing PNR data for one booking may result in multiple VCC requests, as a separate VCC request can be generated for each eligible trip component.

If the PNR Analyser 422 does not match the data in the PNR to the rules in the Corporate Policy, it then updates the Status in the PNR Database 416 to Queued (meaning: put on a queue for processing by the PNR Writer 418 to be returned to the GDS).

The PNR Writer component 418 checks the PNR Database 416 at frequent regular intervals for PNRs that have been queued. It connects to the GDS using the credentials configured for the TMC for that booking and sends the updated PNR to the GDS. If successful, it updates the Status to Delivered (meaning: successfully delivered to the GDS, therefore no further processing by the PNR Writer 418 required). If not successful, it updates the Status to Failed (meaning: not successfully delivered to the GDS, therefore to be re-attempted by the PNR Writer 418 or notified as an error through the Queue Manager).

The VCC manager 430 will now be discussed in further detail. The VCC manager comprised a VCC creator 432, VCC queue 434, VCC interface 436 and VCC API 438 for interaction with the VCC issuer interface 460, for example of a financial institution or credit card service provider.

If a VCC is required, determined by the PNR analyser in accordance with the relevant rules, a VCC Request is sent to the VCC Creator to generate a virtual credit card.

In this embodiment the choice of financial institution for generating the VCC is rule-driven (for example, defined as part of the corporate policy applied by the PNR Analyser).

Typically the travel agency will have an arrangement with a VCC provider (for example, Amex). The customer/traveller may have an arrangement with a credit card provider say Amex and ANZ Visa. Rules define circumstances in which a VCC request is to be sent to the different financial institutions. For example, the rules may define that for flights the system will use travel agency's Amex account to generate the VCC (the travel agency will then later bill it to the customer on an invoice). Another rule may define that for the hotel stay the system will use the customer's Amex arrangements and for the car rental it will use the customer's ANZ Visa arrangements.

The PNR analyser can include in the VCC request the data to be passed to the VCC Creator 432: the financial institution for the VCC; VCC amount (which may be an upper limit or an exact value); and date for the trip component for setting the expiry date for the VCC. This data is provided to the VCC creator in a VCC request.

The VCC Creator component 432 receives the VCC Request from the PNR Analyser 422 and it stores the request on the VCC Queue 434. The VCC request is an asynchronous process, where requests are sent by the intermediary system to an external VCC generator (i.e. financial institution) and there is typically a delay between sending a VCC generation request and receiving the generated VCC details in reply. In a preferred embodiment of the system this processing delay is managed by storing details of forwarded requests in a short term database, referred to in FIG. 4 as the VCC queue, for reconciliation with received VCCs. This system also enables handling of "lost" VCC requests, where no reply is received in response to a VCC generation request—for example, in the event of communication network failure, or system error at the VCC issuing system. The queue can be checked, say every 3 to 5 seconds to identify forwarded VCC generation requests that have not received a VCC in response.

An alternative embodiment may not use a queue and the VCC Interface communicate directly with the VCC Creator to identify when a VCC has been created (or failed). However, in this embodiment monitoring the status of pending requests is problematic. For example, it becomes harder to check what the status of pending requests, as this will require additional signalling to the card issuer interface.

The proposed queue or short term database implementation is easier because a Queue Manager can check the status of the queue and notifications can be setup based upon the status in the queue (for example, send alerts for any VCC requests that have not been processed within 3 minutes), without requiring additional interaction with the financial institution's VCC generator.

In an embodiment the VCC Request sent by PNR Analyser to the VCC Creator is a JSON formatted object, sent to the REST API.

The VCC Request consists of the following details:

| Section | Field | Description | Example |
|---|---|---|---|
| Transaction | Transaction ID | Unique identifier for this VCC transaction | Numeric or Alphanumeric value |
| | Transaction Time | Date, Time, Timezone for this VCC transaction | 2016-05-25T01:21:17+00:00 |

-continued

| Section | Field | Description | Example |
|---|---|---|---|
| | Agency ID | Unique identifier for the Travel Management Company (TMC), including the branch of the TMC | Numeric or Alphanumeric array of values |
| | Client ID | Unique identifier for the client of the TMC, including the branch of the client | Numeric or Alphanumeric array of values |
| | GDS ID | Unique identifier in the GDS (PNR) for the booking that this VCC transaction covers | Numeric or Alphanumeric value |
| Trip | Trip | Trip details for the booking that this VCC transaction covers | Date (array of values: Arrival, Departure, Expiry), Property Details (array of values: Name, Address, Phone, Fax, Email) |
| | Traveller | Traveller details for the booking that this VCC transaction covers | Traveller (array of values: Name, Address, Phone, Email, Cost Centre) |
| | Cost | Cost details for the booking that this VCC transaction covers | Cost (array of values: Currency, Amount), Restrictions (array of values: Currency, Country), FOP (array of values: Issuer, Identifiers) |
| Destination (for each Schedule entry) | Destination ID | Unique identifier for the destination merchant that the notification for this VCC transaction is to be sent to | Numeric or Alphanumeric value |
| | Destination Fax Number (one destination value is mandatory) | E.164 formatted fax numbers for the destination merchant | +19995550123 |
| | Destination Phone Number (one destination value is mandatory) | E.164 formatted phone numbers for the destination merchant | +19995550123 |
| | Destination Email Address (one destination value is mandatory) | E.123 formatted email addresses for the destination merchant | hotel@example.com |
| | Traveller Email Address (one destination value is mandatory) | E.123 formatted email addresses for the traveller | traveller@example.net |

The VCC Request received by the VCC Creator is stored on the VCC Queue.

The VCC Queue consists of the following parts:

| Field | Description | Example |
|---|---|---|
| Transaction ID | Unique identifier for this VCC transaction | Numeric or Alphanumeric value |
| Agency ID | Unique identifier for the Travel Management Company (TMC), including the branch of the TMC | Numeric or Alphanumeric array of values |
| Client ID | Unique identifier for the client of the TMC, including the branch of the client | Numeric or Alphanumeric array of values |
| GDS ID | Unique identifier in the GDS (PNR) for the booking that this VCC transaction covers | Numeric or Alphanumeric value |
| Trip | Trip details for the booking that this VCC transaction covers | JSON arrays of values for Date, Property Details |
| Traveller | Traveller details for the booking that this VCC transaction covers | JSON |
| Cost | Cost details for the booking that this VCC transaction covers | JSON arrays of values for Cost, Restrictions, FOP |
| Destination | Destination communication details for the booking that this VCC transaction covers | JSON |
| VCC ID | Unique identifier for this VCC transaction with the issuer | Numeric or Alphanumeric value |
| VCC | VCC details for this VCC transaction | VCC (array of values: Name, Number, Valid From Date, Valid To Date, CVV, Value Limit) |
| VCC Blank Picture | Blank picture of the CC used by the issuer | Front and Back template pictures |
| Status | Status code for this Notification Message | Numeric value (0: not processed, 1: queued, 2: delivered, 3: deleted, 4: failed) |

The VCC information in the VCC Queue can be stored encrypted, as it contains unmasked/readable credit card data. The data is encrypted using symmetric key encryption, with the key stored in a key vault (e.g. Azure Key Vault), against the particular VCC ID.

The VCC Queue itself can be further encrypted on the file level (e.g. TDE—Transparent Database Encryption for Microsoft SQL).

The VCC Interface component 436 checks the VCC Queue at frequent regular intervals. It is configured to retrieve all requests that have not been processed. The VCC Interface component 436 sends them to the VCC API 438 to generate a VCC and updates the Status to Queued.

If the response from VCC API 438 is unsuccessful, VCC Interface component 436 will update the Status of the request to Failed.

If the response from VCC API 438 is successful, VCC Interface component 436 will update the VCC Queue with the VCC details and update the Status of the request to Delivered.

Each Issuer (i.e. the financial institution) has its own unique and proprietary API for generating the VCCs. The system VCC API 438 is the generic superset API that provides a standardised interface for generating the VCCs. Without the intermediary system VCC API 438, these differences would need to be coded into each component separately for each financial institution, maintained on ongoing basis. The intermediary system VCC API 438 abstracts all of the differences and provides efficiency in changes and expansions to support additional financial institutions and allows the VCC API 438 to be licensed as a modular machine to machine interface to other parties.

Figure 6C:
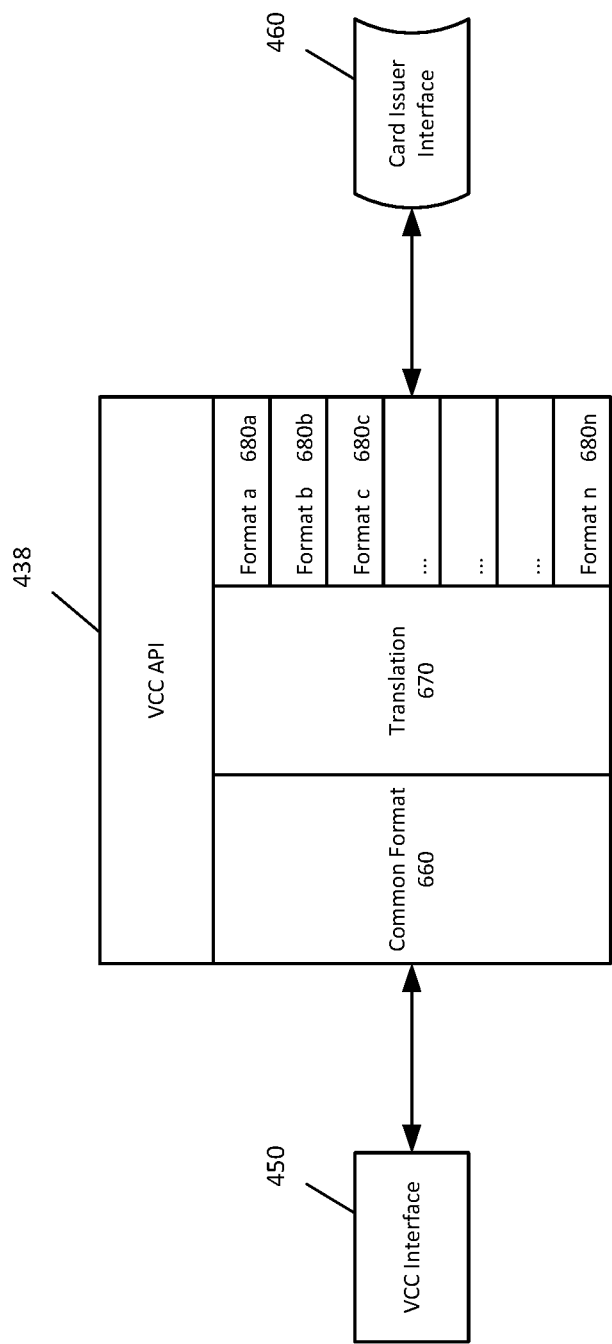
FIG. 6c conceptually illustrates the VCC API functionality for an embodiment of the travel payment intermediary system.

FIG. 6a illustrates the architecture of the present intermediary system, comprising VCC Queue 434, VCC Interface 436, VCC API 438 and the card issuer interface 460 (for any one or more different card service providers/financial institutions 460a-e). FIG. 6b illustrates an example of an alternative architecture that is requires without the VCC API 438, where a separate VCC Interface component 610, 620, 630, 640, 650 would need to be created and maintained for each financial institution 460a-e (e.g. AirPlus 460a, American Express 460b, Diners 460c, MasterCard 460d, Visa 460e etc.). In contrast, in the present system (as illustrated in FIG. 6a) the VCC API 438 is configured to interface to any financial institution interface 460a-e to enable the VCC interface 436 to be generic (or financial institution/VCC issuer agnostic). Similarly to the implementation of the GDS API as described above the VCC API 438 is implemented using a protocol or architecture providing from a VCC interface 436 perspective standard operations using a common format for sending to all VCC issuing systems via the VCC API 438. As illustrated in FIG. 6c the VCC API 438 provides a translation function 670 to convert the common format messages 660 to specific card issuer message formats 690a-n to enable forwarding of self-descriptive messages to be parsed by the respective VCC issuer interfaces to trigger VCC generation. The respective VCC issuer interfaces return data is similarly translated into the common message format by the VCC API. This has an advantage of the handing of VCC requests from the VCC interface being independent of the actual VCC system. To enable new VCC issuing systems to be accommodated by the system only the VCC API need be updated to add translation into the new signalling format.

In an embodiment the VCC API is implemented as a REST API with JSON data objects and OAuth 2.0 authentication.

The following functions are provided through the VCC API:

| Function | Description | Input | Output |
| --- | --- | --- | --- |
| Create-VCC | Create new VCC Used by VCC API | None | VCC ID Name Number Valid From/To Date CVV Value Limit Currency Country |
| Edit-VCC | Edit details of existing VCC Used by VCC API | VCC ID Issuer any of the following: Name Number Valid From/To Date CVV Value Limit Currency Country | VCC ID Name Number Valid From/To Date CVV Value Limit Currency Country |
| Delete-VCC | Delete existing VCC Used by VCC API | VCC ID Issuer | None |
| Get-VCC | Get details of existing VCC Used by VCC API | VCC ID Issuer | VCC ID Name Number Valid From/To Date CVV Value Limit Currency Country |

When the VCC has been successfully generated (Status updated to Delivered), the VCC Creator 432 can send a Notification Message to the Notification Gateway component 442 and update the PNR in the PNR Database 416 for the PNR Writer 418 component to process. The PNR is updated with the VCC details (form of payment details) and status Delivered for updating in the GDS by the PNR Writer. The updated PNR with the Form of Payment (FOP) information is then sent back to the GDS by the PNR Writer 418 via the GDS API 412. Thus, the payment intermediary system operates to automatically update the GDS with the generated VCC data. The GDS may also be updated with other form of payment data generated during analysis, for example to specify trip components payable by the traveller in accordance with the corporate policy rules.

Embodiments of the system can include a communication or notification interface 440 configured to securely communicate the VCC details for a booking to parties to process payment for the travel components. The communication interface 440 comprises a notification gateway 442, notification queue 444 and notification components 470 to accommodate one or more communication technologies.

Managing notification of form of payment data to different parties to the travel transaction automatically is a particularly advantageous feature of some embodiments. To provide context we will discuss some travel booking scenarios and associated payments. Some travel components are typically pre-paid, for example flights. Traditionally for flights, the payment details are recorded in the PNR, for example, credit card (CC) details. The airline, when they issue a ticket, uses these details to charge the CC and the payment transaction is concluded. However, depending on whose CC details are used, there may be post payment issues with reconciliation.

However, for other travel components, such as hotels and cars, payment is handled differently. Such services may be post-paid or paid at the time of travel, rather than prepaid as is the case for flights. Typically, hotels and cars are not charged on a credit card at the time of the booking (the exception are pre-paid hotel stays, but this is not typically used in corporate travel). The hotel or car rental agency only charges the credit card after the traveller checks out of the hotel/returns the car, using the credit card that's given to them by the traveller at the time, or communicated to them in some other way by the travel agency.

For example, for hotels there are typically three scenarios for corporate travel (these scenarios may also be applicable for other trip components):
1) Traveller will give the hotel their personal credit card and then ask for reimbursement from the employer.
2) Traveller will give the hotel their corporate credit card and then have to do an expense report to match the trip details etc. or there may be a central function in the company that does this for everyone.
3) The travel agency will send a fax to the hotel saying "John Smith is staying in your hotel on such and such dates—when he checks out, use our credit card details below to charge the room to" and the agency then needs reconcile these and send out the invoices to various companies that they have done these for. 2 & 3 are the most common scenarios.

These traditional methods work, but there are two problems:
1. security—particularly for #3 above, same credit card number is sent to multiple hotels all over the country/world and sometimes given to travellers as well, increasing the risk for fraud;
2. reconciliation—same credit card number (whether agency's or the traveller's corporate card) is used for multiple trips and components of the trip, making it very very hard to match credit card transactions with the trip details. This can be particularly problematic where the credit card transaction dates do not exactly match the travel dates. This can be a frequent problem. For example, a hotel may only bill a credit card a few days after checkout, and some (typically small) hotels only process payments once or twice a week, for example when a part time bookkeeper is available. Further the amount charged to the credit card rarely matches the amounts specified in the booking. For example, Mary may have used minibar, and Mark may not have filled the petrol before returning the car, thus incurring additional charges. It can therefore be difficult to reconcile a lot of payments on one corporate credit card.

VCCs solve both of the problems discussed above by providing a 1:1 match between the transaction and the trip components. The problem is that these VCC details need to be physically communicated to the hotels/car rental places at the time of the check-in (to put a holding deposit) and the time of the check-out (to bill for the final stay). A significant period of time may elapse between a booking being made and the travel occurring.

In embodiments of the payment intermediary system a notification process is implemented to manage communication of VCC data to vendors. The Notification system takes the VCC details and sends (e.g. faxing) these out to hotels etc. at the correct times. The VCC data can also be made available to travellers as well, for example through an app. For example, the app may be configured to display a generated photo of the VCC. Alternatively the app may integrate with a digital wallet system, or facilitate near field communication (NFC) to communicate VCC details at a point of sale (e.g. Apple Pay) to pay for travel components directly at the time of the trip.

A more detailed overview of an embodiment of a notification interface is illustrated in FIG. 5. If creation of the VCC was successful, VCC Creator 432 will generate a Notification Message that will be sent to the Notification Gateway component 442. The Notification Gateway component 442 will receive the Notification Message and send it through the configured notification channels, for example as illustrated in FIG. 5.

The VCC Creator 432 sends a Notification Message to the Notification Gateway component 442, which stores it on the Main Notifications Queue 444.

The Notification Gateway component 442 can be configured to then check the Main Notification Queue 444 at frequent regular intervals. The Notification Gateway component 442 retrieves all messages from the main notification queue 444 that have not been processed that are due for processing (Schedule Time<Current Time).

In an embodiment the notification interface implements a plurality of queues each associated with one notification technology type, for example Fax, email and online data communication methodologies.

The Notification Gateway 442 reads the Destination Type and sends the message to appropriate {Destination} Notification Queue(s):
Destination Type: Fax→Fax Notification Queue 705
Destination Type: Phone→Online Notification Queue 715
Destination Type: Email→Email Notification Queue 710
Destination Type: Web→Online Notification Queue 715
Destination Type: App→Online Notification Queue 715

When a message has been successfully queued to the appropriate {Destination} Notification Queue(s), Notification Gateway 442 will update the Status of the Notification Message on the Main Notification Queue 444 to Queued.

In an embodiment the Notification Message sent by VCC Creator 432 to Notification Gateway is a JSON formatted object, sent to the REST API.

The Notification Message consists of the following details:

| Section | Field | Description | Example |
| --- | --- | --- | --- |
| Transaction | Transaction ID | Unique identifier for this VCC transaction | Numeric or Alphanumeric value |
| | Transaction Time | Date, Time, Timezone for this VCC transaction | 2016-05-25T01:21:17+00:00 |
| | Agency ID | Unique identifier for the Travel Management Company (TMC), including the branch of the TMC | Numeric or Alphanumeric array of values |
| | Client ID | Unique identifier for the client of the TMC, including the branch | Numeric or Alphanumeric array of values |

| Section | Field | Description | Example |
|---|---|---|---|
| | | of the client | |
| | GDS ID | Unique identifier in the GDS (PNR) for the booking that this VCC transaction covers | Numeric or Alphanumeric value |
| Trip | Trip | Trip details for the booking that this VCC transaction covers | Date (array of values: Arrival, Departure, Expiry), Property Details (array of values: Name, Address, Phone, Fax, Email) |
| | Traveller | Traveller details for the booking that this VCC transaction covers | Traveller (array of values: Name, Address, Phone, Email) |
| | Cost | Cost details for the booking that this VCC transaction covers | Cost (array of values: Currency, Amount), Restrictions (array of values: Currency, Country) |
| VCC | VCC ID | Unique identifier for this VCC transaction with the issuer | Numeric or Alphanumeric value |
| | VCC | VCC details for this VCC transaction | VCC (array of values: Name, Number, Valid From Date, Valid To Date, CVV, Value Limit) |
| | VCC Blank Picture | Blank picture of the CC used by the issuer | Front and Back template pictures |
| Schedule (multiple expected) | Destination Type | Type of destination (fax, email, web, app, phone) that notification for | Destination |
| | Schedule Time | Date, Time, Timezone when this notification is to be sent | 2016-06-01T01:21:17+00:00 |
| Destination (for each Schedule entry) | Destination ID | Unique identifier for the destination merchant that the notification for this VCC transaction is to be sent to | Numeric or Alphanumeric value |
| | Destination Fax Number (one destination value is mandatory) | E.164 formatted fax numbers for the destination merchant | +19995550123 |
| | Destination Phone Number (one destination value is mandatory) | E.164 formatted phone numbers for the destination merchant | +19995550123 |
| | Destination Email Address (one destination value is mandatory) | E.123 formatted email addresses for the destination merchant | hotel@example.com |
| | Traveller Email Address (one destination value is mandatory) | E.123 formatted email addresses for the traveller | traveller@example.net |
| Message (for each Destination entry) | Message Header | Formatted header of the message | HTML3 formatted data |
| | Message Footer | Formatted footer of the message | HTML3 formatted data |
| | Message Body | Formatted body of the message, containing Traveller details, Trip details, VCC details | HTML3 formatted data |

The VCC and Message Body information in the Notification Message is preferably stored encrypted, as it contains unmasked/readable credit card data. The data is encrypted using symmetric key encryption, with the key stored in a key vault (e.g. Azure Key Vault), against the particular VCC ID.

The Notification Message received by the Notification Gateway is stored on the Main Notification Queue.

The Main Notification Queue can consist of the following parts:

| Field | Description | Example |
|---|---|---|
| Notification ID | Unique identifier for this Notification Message | Numeric or Alphanumeric value |
| Transaction ID | Unique identifier for this VCC transaction | Numeric or Alphanumeric value |
| VCC ID | Unique identifier for this VCC transaction with the issuer | Numeric or Alphanumeric value |
| Notification Message | Notification Message | JSON |
| Destination Type | Type of destination (fax, phone, email, web, app) that notification for | Destination (Fax, Phone, Email, Web, App) |
| Schedule Time | Date, Time, Timezone when this notification is to be sent | 2016-06-01T01:21:17+00:00 |

| Field | Description | Example |
|---|---|---|
| Status | Status code for this Notification Message | Numeric value (0: not processed, 1: queued, 2: delivered, 3: deleted) |

The Notification Message in the Main Notification Queue is stored encrypted, as it contains unmasked/readable credit card data. The data is encrypted using symmetric key encryption, with the key stored in a key vault (e.g. Azure Key Vault), against the particular VCC ID.

The Main Notification Queue itself is further encrypted on the file level (e.g. TDE—Transparent Database Encryption for Microsoft SQL).

The Notification Gateway 442 component checks the Main Notification Queue 444 at frequent regular intervals. It retrieves all messages that have not been processed that are due for processing (Schedule Time<Current Time).

Based on the Destination Type, it sends them to the appropriate {Destination} Notification Queue and updates the Status to Queued. In the illustrated example the destination queues include fax notification queue 705, email notification queue 710 and online notification queue 715. Each of these are queried periodically by respective gateways, which then processes and appropriately sends the notification via the associated communication channel. In the example shown the gateways provided are a fax gateway 720, email gateway 725 and online gateway 730. In the illustrated embodiment the online gateway is configured to handle web, phone and application based messaging, for example push notifications or application specific data signalling. However, in some embodiments individual queues and respective gateways may be used.

The {Destination} Notification Queue(s) (separate one for each Destination Type) consists of the following parts:

| Field | Description | Example |
|---|---|---|
| Notification ID | Unique identifier for this Notification Message | Numeric or Alphanumeric value |
| VCC ID | Unique identifier for this VCC transaction with the issuer | Numeric or Alphanumeric value |
| Message Header | Formatted header of the message | HTML3 formatted text |
| Message Footer | Formatted footer of the message | HTML3 formatted text |
| Message Body | Formatted body of the message, containing Traveller details, Trip details, VCC details | HTML3 formatted text |
| Schedule Time | Date, Time, Timezone when this notification is to be sent | 2016-06-01T01:21:17+00:00 |
| Status | Status code for this Notification Message | Numeric value (0: not processed, 1: queued, 2: delivered, 3: deleted, 4: failed) |
| One of the following (for different types of Destination Notification Queue (s)): | | |
| Destination Fax Number | E.164 formatted fax numbers for the destination merchant | +19995550123 |
| Destination Phone Number | E.164 formatted phone numbers for the destination merchant | +19995550123 |
| Destination Email Address | E.123 formatted email addresses for the destination merchant | hotel@example.com |
| Traveller Email Address | E.123 formatted email addresses for the traveller | traveller@example.net |

The Message Body in a {Destination} Notification Queue is stored encrypted, as it contains unmasked/readable credit card data. The data is encrypted using symmetric key encryption, with the key stored in a key vault (e.g. Azure Key Vault), against the particular VCC ID.

The {Destination} Notification Queue(s) themselves are further encrypted on the file level (e.g. TDE—Transparent Database Encryption for Microsoft SQL).

Notifications components have an API that is used for communicating internally and with other components.

In an embodiment the notification API is a REST API with JSON data objects and OAuth 2.0 authentication.

The following functions are provided through the Notification API:

| Function | Description | Input | Output |
|---|---|---|---|
| Get-Queued-List-Main-All | Get list of all messages from the Main Notification Queue Used by Queue Manager | None | Notification ID, Transaction ID, VCC ID Destination Type Schedule Time Status |
| Get-Queued-List-Main-Unprocessed | Get list of unprocessed messages from the Main Notification Queue Used by Notification Gateway | None | Notification ID Transaction ID VCC ID Destination Type Schedule Time Status |
| Search-Message-Main | Search list of messages from the Main Notification Queue Used by Queue Manager | any of the following: Notification ID Transaction ID VCC ID Destination Type Schedule Time Status | Notification ID Transaction ID VCC ID Destination Type Schedule Time Status |
| Get-Message | Get details of selected message from the Main Notification Queue and the | Notification ID | Notification ID Transaction ID VCC ID Destination |

| Function | Description | Input | Output |
|---|---|---|---|
| | relevant {Destination} Notification Queue | | Type Schedule Time Main Queue Status Destination Queue Status Message Header any of the following: Destination Fax Number Destination Phone Number Destination Email Address Traveller Email Address |
| Queue-Message | Re-queue selected message to the Main Notification Queue Used by Queue Manager | Notification ID | None |
| Delete-Message | Delete selected message from the Main Notification Queue (cancel sending) Used by Queue Manager | Notification ID | None |
| Get-Queued-List-{DestinationType}-All | Get list of all messages from the specified {Destination} Notification Queue Used by Queue Manager | None | Notification ID Destination Type Schedule Time Status Message Header |
| Search-Message-{Destination} | Search list of messages from the Main Notification Queue Used by Queue Manager | any of the following: Notification ID Schedule Time Status | Notification ID Destination Type Schedule Time Status Message Header |
| Update-Status-{Destination} | Update Status of selected message in the {Destination} Notification Queue Used by {Destination} component | Notification ID Status | None |

The Fax Gateway component 720 checks the Fax Notification Queue 705 at frequent regular intervals. It retrieves all messages that have not been processed that are due for processing (Schedule Time<Current Time).

The component will update the Status of the Notification Message that is due for processing from Not Processed to Queued and then combine the Message Header, Message Body and Message Footer into a single Message page.

The Fax Gateway 720 will then read the Destination Fax Number and send the Message via the fax interface.

The fax interface attempts to send the fax to the destination through the hardware connection to the PSTN or ISDN. Successful deliveries are recorded as delivered. Unsuccessful deliveries (busy, no answer, failed) are re-attempted after a configured interval. If still unsuccessful after a configured number of times, they are recorded as failed.

The Fax Gateway component 720 will update the Status of the Notification Message that has been processed from Queued to Delivered or Failed.

The Email Gateway component 725 checks the Email Notification Queue 710 at frequent regular intervals. It retrieves all messages that have not been processed that are due for processing (Schedule Time<Current Time).

The component will update the Status of the Notification Message that is due for processing from Not Processed to Queued and then combine the Message Header, Message Body and Message Footer into a single Message page.

The Email Gateway 725 will then read the Destination Email Address and send the Message to the email interface. The email interface attempts to send the email to the destination through the network connection using SMTP with SSL/TLS. Successful deliveries are recorded as delivered.

Unsuccessful deliveries (non-permanent failures) are re-attempted after a configured interval. If still unsuccessful after a configured number of times, they are recorded as Failed.

The Email Gateway component 725 will update the Status of the Notification Message that has been processed from Queued to Delivered or Failed.

The Online Gateway component 730 checks the Online Notification Queue 715 at frequent regular intervals. It retrieves all messages that have not been processed that are due for processing (Schedule Time<Current Time). The component will update the Status of the Notification Message that is due for processing from Not Processed to Queued and then combine the Message Header, Message Body and Message Footer into a single Message page.

The Online Gateway 730 will then read the Destination Email Address or Traveller Email Address as the unique username identifier, which can be used for requesting or routing the notification and send the Message to the Online Database component 735. It should be appreciated that for to online notifications these may be received in response to a request for the notification (pull) rather than being forwarded to a destination (push). For example, a destination software application may query the system to retrieve notifications from the online database rather than these being transmitted directly, as is the case for a fax communication.

The Online Gateway component 730 checks the Online Database 735 component at frequent regular intervals for the Status of the queued Notification Message(s). The component will update the Status of the Notification Message that has been processed to Delivered.

The Online Database component 735 stores the Notification Message(s) it receives from the Online Gateway component 730. Through the Online API it then makes it available to Web Gateway 745, Phone Gateway 755 and App Gateway 750 components.

The Online Database consists of the following information:

| Field | Description | Example |
|---|---|---|
| Notification ID | Unique identifier for this Notification Message | Numeric or Alphanumeric value |
| (Encrypted) Message | Notification Message | HTML3 formatted data |
| Schedule Time | Date, Time, Timezone when this notification is to be made available | 2016-06-01T01:21:17+00:00 |
| Destination Email Address | E.123 formatted email addresses for the destination merchant | hotel@example.com |
| Traveller Email Address | E.123 formatted email addresses for the traveller | traveller@example.net |
| Status | Status code for this Notification Message | Numeric value (1: queued, 2: delivered) |

The Notification Message in the Online Database 735 is stored encrypted, as it contains unmasked/readable credit card data. The data is encrypted using symmetric key encryption, with the key stored in a key vault (e.g. Azure Key Vault), against the particular Notification ID. The Online Database itself is further encrypted on the file level (e.g. TDE—Transparent Database Encryption for Microsoft SQL).

In an embodiment the Online API 740 is a REST API with JSON data objects and OAuth 2.0 authentication.

The online database API 740 provides a machine to machine interface to allow online system to access the notifications in the online database 735. This allows flexibility of integration of the system with a variety of external online systems via the online database API 740.

Any external system may be configured to utilise the online database API 740. Similarly as described above for the GDS API and VCC API, the Online API is implemented using a protocol or architecture providing standard operations to enable forwarding of self-descriptive messages to be parsed by the respective external online systems and trigger notifications.

The following functions are provided through the Online Database API 740:

| Function | Description | Input | Output |
|---|---|---|---|
| Get-Message | Get details of selected message from the Online Database | Destination Email Address or Traveller Email Address | Notification ID Schedule Time (Decrypted) Message |
| Update-Status | Update Status of selected message in the Online Database | Notification ID Status | None |

After verifying authentication and processing a Get-Message request, the component 740 will request the key for that message from the key vault, decrypt the message and send the decrypted message contents as a response to the request and update the Status of the message to Delivered.

The authentication for access to the Online Database 735 may be performed through one or more of the following:
Username and Password
One-time Password
One-time time-restricted Code Web Gateway 745 component is a website used to authenticate access to the Online Database 735 and provide the Notification Message (i.e. the virtual card details) to the user requesting it.

The system can be configured to limit the time a notification message is available for access. For example, the system can be configured to enable access to a notification of VCC details using a time window temporally linked to the time period where the VCC details will be required by the vendor (i.e. a hotel) for affecting the required payment for services. The Notification Message will only be available after the Schedule Time and for a configured length of time, after which it will no longer be available. For example, for a VCC generated for payment for a hotel stay, the access window may be scheduled to open on the day of the reservation (or one or two days before) and close one week after the scheduled checkout date. This access window can be configurable, using rules, and can vary for different trip component types (i.e. different time windows for hotel stays, car hire, tours etc.) and may vary between different implementations of the system.

Phone Gateway component 755 is an IVR application used to authenticate access to the Online Database 735 and provide the Notification Message (i.e. the virtual card details) to the caller requesting it.

The Notification Message will only be available after the Schedule Time and for a configured length of time, after which it will no longer be available.

App Gateway component 750 can be a companion app for the traveller used to authenticate access to the Online Database 735 and provide the Notification Message (i.e. the virtual card details) to the user.

The Notification Message will only be available after the Schedule Time and for a configured length of time, after which it will no longer be available.

Maintaining the integrity of various temporary databases/queues and monitoring queues can be managed in some embodiments of the system via a queue manager component as illustrated in FIG. 6. The Queue Manager component 810 is configured to allow monitoring the transactional behaviour of the queues and based on limited queue item data access. The Queue Manager component 810 provides the ability to view the VCC Queue 432, Main Notification Queue 444 and the {Destination} Notification Queue(s) 705, 710, 715, 735 and perform direct actions on the items in the queue.

For each queue, the Queue Manager 810 can view:
Notification ID
VCC ID
Agency ID
Client ID
GDS ID
Traveller Details
Destination ID
Destination Type
Destination Contact
Schedule Time
Status The Queue Manager 810 cannot be used to view the details of the VCC (i.e. the credit card number).

For each Notification Message in a queue, the Queue Manager 810 can Re-Send or Delete the message, but not Edit the message.

Data security is an important aspect of the system, particularly as the system stores personal identification and financial information. The following are the main types of data that flow through the system: Form of Payment Data, Traveller Data and Trip Data. The Form of Payment Information covers the credit card data for each booking that is processed by the system. This information includes the credit card name, number, expiry date and CVV details. The Traveller Information is considered Personally Identifiable Information as it contains direct personal details of a traveller for each booking that is processed by the system. This information includes data such as full name, contact details and identification document details. The Trip Information contains the travel details of the bookings that are processed through the system. This information on its own does not contain Personally Identifiable Information.

The Form of Payment data can be generated by the system, added to the booking information for downstream payment processing (e.g. for airfare tickets) and/or sent to a third-party to charge against at a later date (e.g. for hotel stays). The VCC Creator component generates a VCC Request message into the VCC Queue. The VCC Interface component, through the VCC API, generates the virtual credit card details and saves them on the VCC Queue. The VCC Creator uses the generated VCC details on the VCC Queue to update the booking in the PNR Database and/or notify the merchant through the Notification Gateway component.

Maintaining data security is important for the system. The system contains two types of confidential data:

Personally Identifiable Information—related to the Traveller; and

Credit Card Data—related to the Virtual Credit Cards.

The Personally Identifiable Information related to the Traveller includes data such as full name, contact details and identification document details. The Credit Card Data includes the credit card name, number, expiry date and CVV details.

Both of these types of data are passed through nearly all components of the system and stored in the following components:

PNR Database
VCC Queue
Main Notification Queue
Destination Notification Queue(s)
Online Database Some embodiments aim to maintain security and data integrity using encrypted data stores. The data stores are encrypted on the system and file level through the use built-in operating system and database system tools (e.g. TDE—Transparent Database Encryption for Microsoft SQL).

The credit card data in these data stores is stored encrypted on the field level through the use of symmetric key encryption. The key for each individual data field is stored in a stand-alone secure key vault (e.g. Azure Key Vault) against a particular identifier for that field in that data store (e.g. VCC ID in the VCC Queue).

Embodiments can also be configured to transmit data between components in encrypted form through the SSL/TLS protocol. Where possible, data with external components is transmitted in encrypted form (SSL/TLS) or through point-to-point communication channels (e.g. fax).

Figure 7:
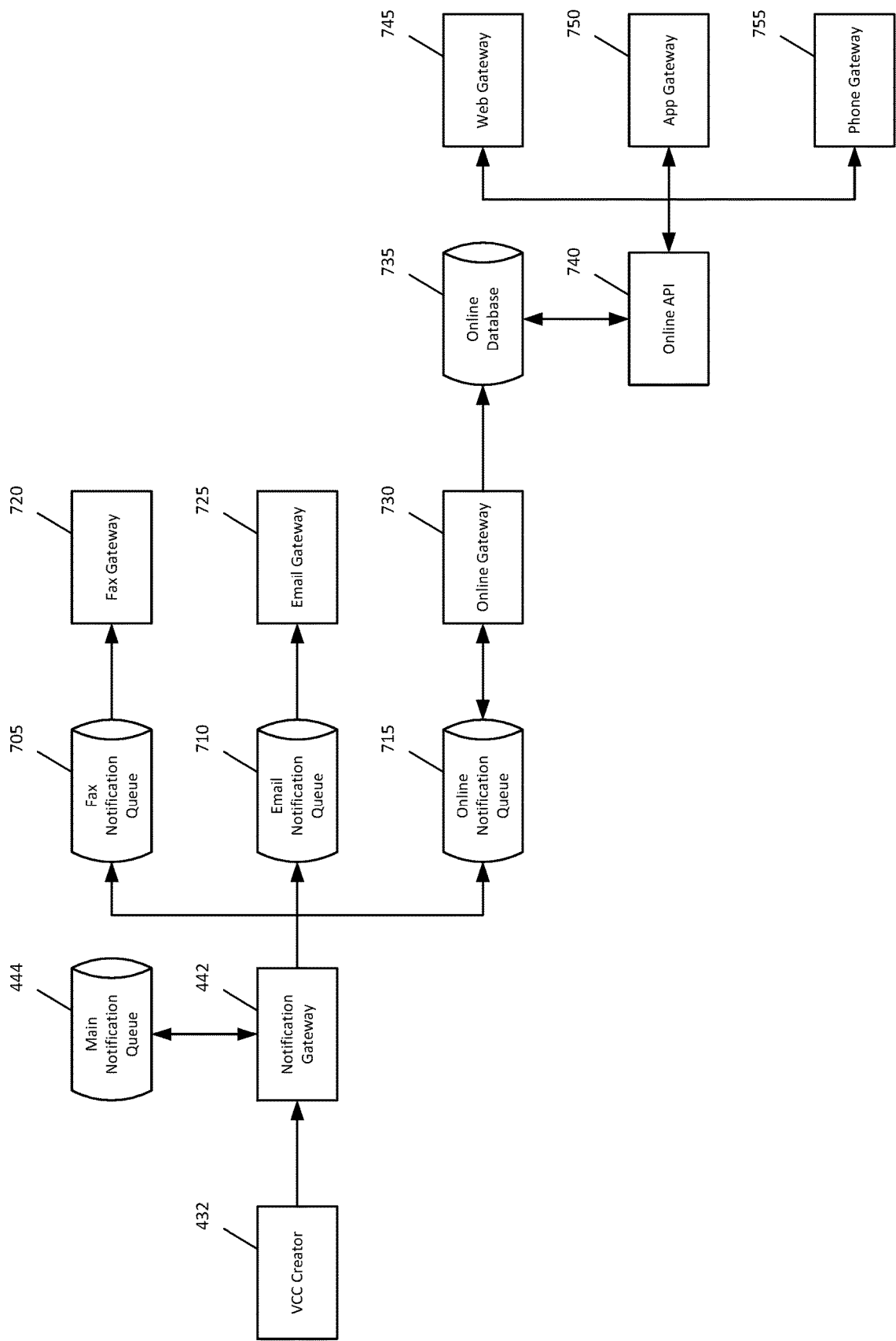
FIG. 7 is a block diagram of an embodiment of a notification interface of the system.

Some embodiments of the system can include a data cleaner component for maintaining data integrity and data security, and example of which is illustrated in FIG. 7. The Data Cleaner component 910 goes through the queues and databases at regular intervals and cleans (masks) all credit card data deemed obsolete. For example, where the Expiry Date for the VCC is past the Current Date, OR the last date of the trip is a configured time interval past the Current Date and it can be assumed that the VCC is now obsolete. For example the data cleaner 810 can be configured to mask obsolete credit card and VCC data in:

PNR Database 416
VCC Queue 432
Main Notification Queue 444
Destination Notification Queue(s) 705, 710, 715
Online Database 735

Figure 8:
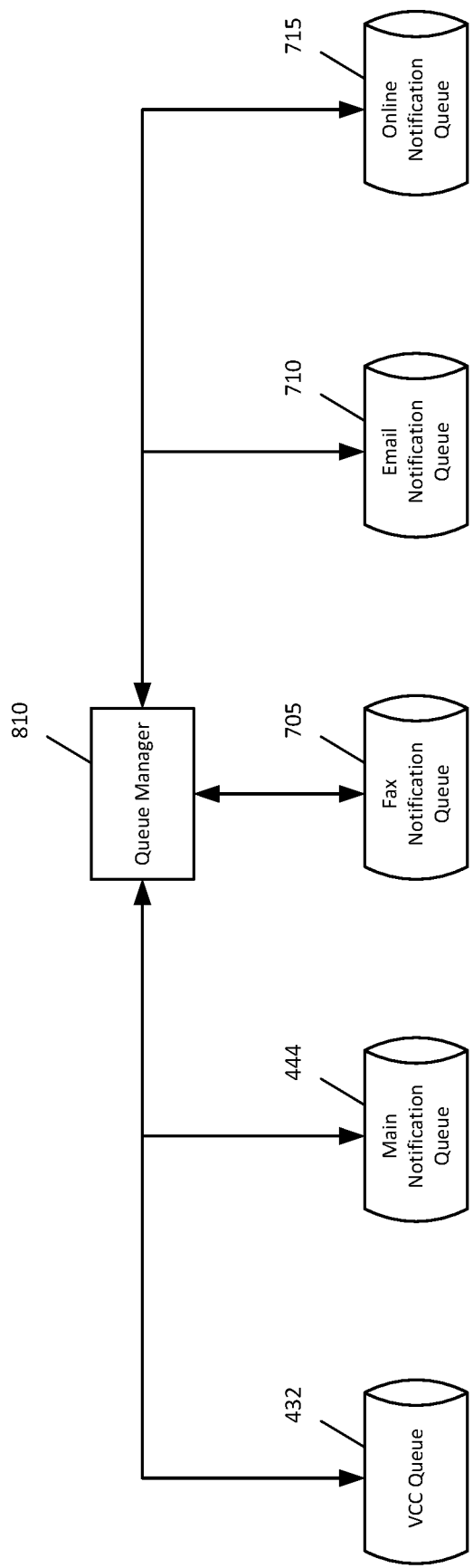
FIG. 8 is a block diagram illustrating an example of a queue manager module interacting with various queues or temporary databases of the system.
Figure 9:
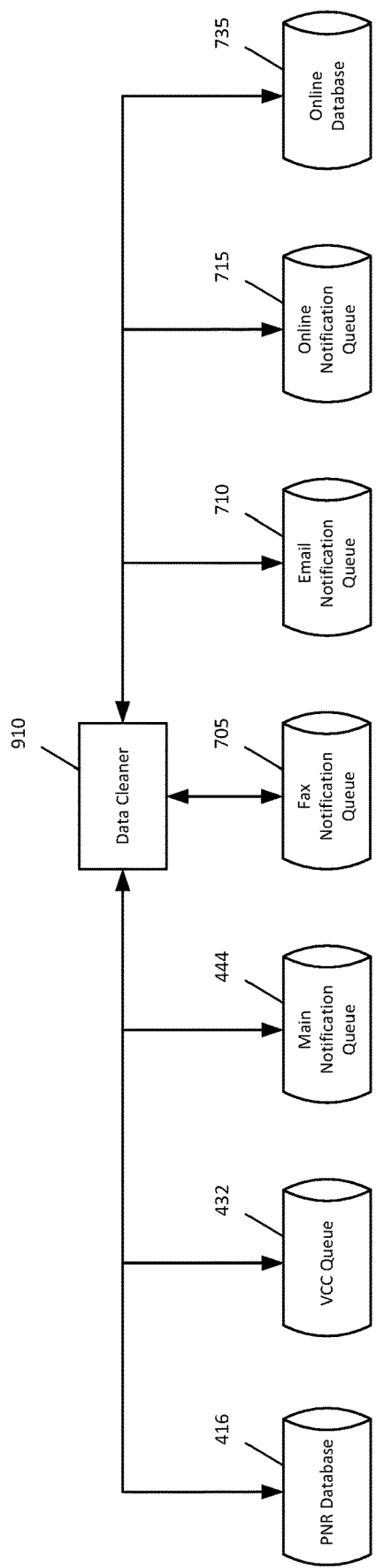
FIG. 9 is a block diagram illustrating an example of a data cleaner module interacting with various databases of the system.
Figure 10:
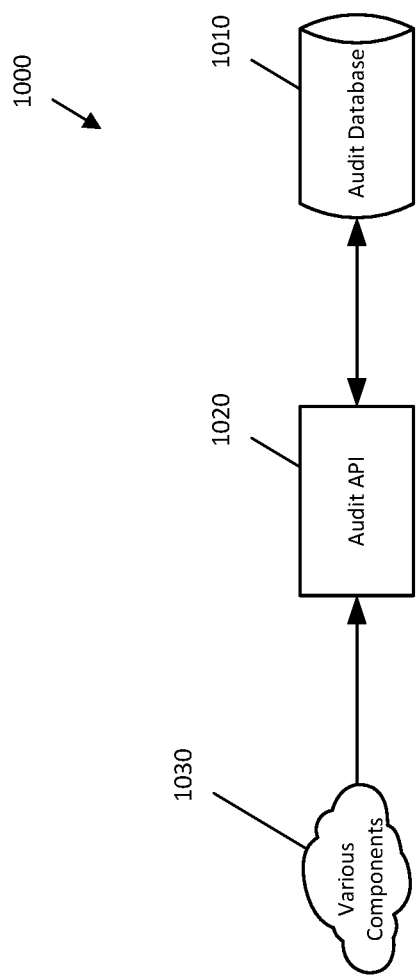
FIG. 10 is a block diagram of an example of an Audit log module in accordance with an embodiment of the system.

The VCC system can also be configured to provide a centralised secure repository of all audit messages generated by all of the components. In an embodiment this is implemented as an Audit log subsystem as shown in FIG. 8.

The Audit Log 1000 consists of the Audit Database 1010 and the Audit API 1020 that is called by all other components 1030 of the system to send audit messages. For example, the database 1010 may be configured to store a plurality of audit logs, storing audit messages for the various system components 1030, i.e. the PNR analyser 422, PNR Reader 418, PNR Writer 414, VCC creator 432, VCC interface 436, notification gateway 442 etc. In a preferred embodiment, to maintain the integrity of the data, the Audit API 1020 is not able to delete any messages stored in the logs 1010. In addition, all audit messages can also be replicated to a separate read-only (insert-only) system.

The Audit Database 1010 is encrypted on the file level (e.g. TDE—Transparent Database Encryption for Microsoft SQL) and all communication with the Audit API is encrypted in transit using SSL/TLS. It does not store any unmasked credit card data.

The Audit Database 1010 consists of the following information:

| Field | Description | Example |
| --- | --- | --- |
| Message Time | Date, Time, Timezone when this log entry is created | 2016-06-01T01:21:17+00:00 |
| Event ID | Unique identifier for this type of log event (e.g. component that generated the log entry) | Numeric or Alphanumeric value |
| Message Type | Type of message (e.g. info, warning, error) | Event message type |
| Message Text | Contents of the message | Event message |

The following functions are provided through the Audit API:

| Function | Description | Input | Output |
| --- | --- | --- | --- |
| Get-Message | Search list of messages from the Audit Database | any of the following: Message Time Start Message Time | Message Time Event ID Message Type Message Text |

-continued

| Function | Description | Input | Output |
|---|---|---|---|
| Save-Message | Save a new message in the Audit Database | End Event ID Message Type Message Text Message Time Event ID Message Type Message Text | None |

It should be appreciated that the system as described above provides a secure interface system to facilitate automatic generation of virtual credit cards and association of the VCCs with travel components such that the VCC details can be communicated for application to affect payments for the associated travel components. This enables a one to one relationship to exist between a payment transaction and a travel itinerary item. This can significantly simplify the process of reconciling and managing travel expenses, particularly for corporate travel.

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

ACRONYM GLOSSARY

API—Application Programming Interface, Protocol for computer systems to exchange data.

CVV—Card Verification Value, Security code for credit cards.

E.123—International standard for formatting of email addresses.

E.164—International standard for formatting of telephone numbers.

FOP—Form of Payment Information, on the method of payment (e.g. credit card details) to be used to process a payment.

GDS—Global Distribution System, Database and interface for searching, reserving and purchasing travel products (e.g. flights, hotels, cars).

HTML—HyperText Markup Language, Computer code for formatting of text.

HTTP—HyperText Transfer Protocol, Protocol for computer systems to request, receive and transfer data.

ISDN—Integrated Services Digital Network, Digital voice and data telephone network.

IVR—Interactive Voice Response, Method for a person to interact with a computer system through the telephone system by pressing keys on the phone or using voice recognition technology.

JSON—JavaScript Object Notation, Standard for formatting of data when exchanging it with other computer systems or components.

OAuth—Standard for authenticating and exchanging authorisation data between computer system or components.

OBT—Online Booking Tool, Website for travellers to book flight(s), hotel(s), car(s) directly with their TMC's computer systems.

PNR—Passenger Name Record, Booking data containing information about traveller(s) and their trip(s).

PSTN—Public Switched Telephone Network, Analogue voice and data telephone network.

REST API—Representational State Transfer Application Programming Interface, Protocol for computer systems to exchange data over HTTP.

SMTP—Simple Mail Transfer Protocol, Protocol for computer systems to send and receive emails.

SSL/TLS—Secure Sockets Layer/Transport Layer Security, Protocol for computer systems to send and receive data in encrypted form.

TDE—Transparent Data Encryption, Feature of Microsoft SQL database for encrypting database files.

TMC—Travel Management Company, Travel agency specialising in corporate/business travel.

VCC (or VCN)—Virtual Credit Card (or Virtual Card Number), One-time-use credit card number with fixed expiry date and fixed spending limit.

XML—Extensible Markup Language, Standard for formatting of data when exchanging it with other computer systems or components.

The invention claimed is:

1. A travel payment intermediary system implemented using computer processing and memory resources and configured to integrate with one or more travel booking systems and one or more external virtual credit card issuing systems via a communication network, the system comprising:
   a travel booking system interface configured to communicate with at least one travel booking system to obtain travel booking data stored in the travel booking system of a travel booking associated with at least one traveller the booking data having been prepared using the travel booking system, the booking data including traveller data enabling identification of the at least one traveller, and trip data defining one or more trip components of an itinerary for the at least one traveller;
   a booking analyser engine configured to analyse the obtained booking data and automatically determine, for each trip component, cost component data associated with the trip component and whether a virtual credit card payment method is accepted for the trip component; and
   a virtual credit card (VCC) interface comprising a machine to machine (M2M) interface configured to:
   communicate with one or more VCC supplier application programming interfaces (APs) using a generic superset API;
   manage asynchronous requesting and receiving of VCCs and
   a queuing system comprising at least one temporary database, the VCC interface being configured to:
   automatically generate a VCC request using the cost component data for a trip component where the trip component is assessed as eligible for VCC payment;
   forward the VCC request to an external VCC issuing system via the communication network using the M2M interface;

store a copy of the transmitted VCC request in a database record, the database record including VCC request data and VCC request status:

monitor for asynchronous receipt of a VCC generated by the external VCC issuing system via the communication network using M2M interface, receive the VCC from the external VCC issuing system, and in response to receiving the VCC from the external VCC issuing system, updating the database record with VCC details and the VCC status, triggering the analyser engine to associate the VCC with the trip component in the cost component data and send updated trip component data to the travel booking system to update the travel booking data stored in the travel booking system for the trip component to enable payment for the trip component using the VCC.

2. A travel booking payment intermediary system as claimed in claim 1 wherein the booking analyser engine is configured to, for each item of an itinerary, apply analysis rules to:

determine if a cost component is associated with the itinerary item, and where a cost component is associated with the itinerary item:

determine item value data, and cost timing data;

determine, for the cost component, payment types accepted and where the itinerary item cost component is VCC eligible generate VCC request data.

3. A travel booking payment intermediary system as claimed in claim 2 wherein the booking analyser engine is configured to apply analysis rules to select a VCC supplier for a VCC eligible cost component.

4. A travel payment intermediary system as claimed in claim 1 wherein the travel booking system interface is a machine to machine (M2M) interface configured to retrieve travel data from one or more global distribution systems storing traveller booking data.

5. A travel payment intermediary system as claimed in claim 4 wherein the travel booking system interface M2M interface provides a standardised interface for communication with each of the one or more GDSs using a generic superset application programming interface (API) for communicating with the one or more global distribution systems.

6. A travel payment intermediary system as claimed in claim 1 wherein the travel booking system interface is configured to periodically query each of the one or more travel booking systems to retrieve travel booking data.

7. A travel payment intermediary system as claimed in claim 1 further comprising a communication interface configured to provide generated VCC data to a destination associated with the trip component associated with the VCC.

8. A travel payment intermediary system as claimed in claim 7 where the generated VCC data is provided via a secure communication interface.

9. A travel payment intermediary system as claimed in claim 8 wherein the communication interface is configured to automatically transit the VCC data to a destination.

10. A travel payment intermediary system as claimed in claim 8 wherein the communication interface is configured to provide controlled access to the VCC data.

11. A travel payment intermediary system as claimed in claim 10 wherein the communication interface is configured to provide access to the VCC data for a limited period of time, the limited period of time being temporally associated with the trip component for which the VCC was generated.

12. A method of facilitating a travel payment executed by a travel payment intermediary system implemented using computer processing and memory resources and configured to integrate with one or more travel booking systems and one or more external virtual credit card issuing systems via a communication network, the method comprising the steps of:

obtaining travel booking data stored in the travel booking system the booking data having been prepared using the travel booking system, by a travel booking system interface configured to communicate with at least one travel booking system, the travel booking data being of a travel booking associated with at least one traveller, the booking data including traveller data enabling identification of the at least one traveller, and trip data defining one or more trip components of an itinerary for the at least one traveller;

analysing, by a booking analyser engine, the obtained booking data to automatically determine, for each trip component, cost component data associated with the trip component and whether a virtual credit card payment method is accepted for the trip component; and for each trip component, where the VCC is accepted for payment, a virtual credit card (VCC) interface, comprising a machine to machine (M2M) interface using a generic superset API, communicating with one or more VCC supplier application programming interfaces (APIs), and managing asynchronous requesting and receiving of VCCs and;

a queuing system comprising at least one temporary database, the VCC interface configured to perform the steps of:

generating automatically a VCC request using the cost component data for a trip component;

forwarding the VCC request to an external VCC issuing system via the communication network using the M2M interface:

storing a copy of the transmitted VCC request in a database record, the database record including VCC request data and VCC request status:

monitoring for asynchronous receipt of a VCC generated by the external VCC issuing system via the communication network using M2M interface: receiving the VCC from the external VCC issuing system; and in response to receiving the VCC from the external VCC issuing system, updating the database record with VCC details and the VCC status, triggering the analyser engine to associate the VCC with the trip component in the cost component data and send updated trip component data to the travel booking system to update the travel booking data stored in the travel booking system to enable payment for the trip component using the VCC.

* * * * *